(12) United States Patent
Wentland et al.

(10) Patent No.: US 7,162,463 B1
(45) Date of Patent: Jan. 9, 2007

(54) PATTERN RECOGNITION TEMPLATE CONSTRUCTION APPLIED TO OIL EXPLORATION AND PRODUCTION

(75) Inventors: Robert Wentland, Boulder, CO (US); Peter Whitehead, San Rafael, CA (US)

(73) Assignee: Chroma Energy, Inc., Houston, TX (US)

( * ) Notice: Subject to any disclaimer, the term of this patent is extended or adjusted under 35 U.S.C. 154(b) by 643 days.

(21) Appl. No.: 10/308,860

(22) Filed: Dec. 3, 2002

Related U.S. Application Data

(60) Provisional application No. 60/395,959, filed on Jul. 12, 2002.

(51) Int. Cl.
*G06F 17/00* (2006.01)
*G06N 5/02* (2006.01)

(52) U.S. Cl. ............................... 706/48; 706/12; 706/14

(58) Field of Classification Search ................... 706/48, 706/12, 14; 707/6; 382/113
See application file for complete search history.

(56) References Cited

U.S. PATENT DOCUMENTS

| | | | |
|---|---|---|---|
| 4,015,366 A | 4/1977 | Hall, III | 47/1 R |
| 5,513,271 A * | 4/1996 | Rao et al. | 382/113 |
| 5,893,095 A | 4/1999 | Jain et al. | 707/6 |
| 6,018,587 A | 1/2000 | Cabib | 382/165 |
| 6,232,974 B1 | 5/2001 | Horvitz et al. | 345/419 |
| 6,282,309 B1 | 8/2001 | Emery | 382/145 |

OTHER PUBLICATIONS

A. G. Pramanik et al, Leveraging Seismic Technologies For Stratigraphic / Subtle Trap Exploration: An Overview, 1999, Geohorizons vol. 4, No. 1, 1-26.*
Hiroto Yoshii, Pyramid Architecture Classification Tree, 1996, IEEE1015-4651/96, 310-314.*
T. B. Berge et al, Seismic inversion successfully predicts reservoir, porosity, and gas content in Ibhubesi Field, Organge Basin, South Africa, 338-348.*
Kagan Tumer et al, Robust Combining of disparate classifiers through Order Statistics, 2001, NSF Grant ECS 9900353.*
Hiroto Yoshii, Pyramid Architecture Tree, 1996, IEEE, Proceedings of the 1996 International Conference on Pattern Recognition (ICPR '96), 310-314.*
International Search Report from PCT/US03/21723, Oct. 10, 2003.
Yoshii, Hiroto, *Pyamid Architecture Classification Tree*, Proceedings of the 1996 International Conference on Pattern Recognition (ICPR '96), IEEE 1015-4651, pp. 310-314, 1996.

(Continued)

*Primary Examiner*—Joseph P. Hirl
(74) *Attorney, Agent, or Firm*—Baker Botts L.L.P.

(57) ABSTRACT

An apparatus, system, and set of methods are provided for building templates that can be used in the exploration and production oil and gas deposits. A personal computer is used to perform calculations on known data to generate hyperdimensional templates that are stored within a pattern database. The hyperdimensional templates are generated in a layered series of cutting, attributing, and statisizing phases using data known to represent existing oil and gas reservoirs. The hyperdimensional templates are stored in a pattern database. Methods are provided for identifying misclassifications and otherwise determine the quality of the templates in the pattern database.

72 Claims, 11 Drawing Sheets

OTHER PUBLICATIONS

International Search Report (PCT/US03/21724), Oct. 10, 2003.

Tumer, K., et al., *Robust Combining of Disparate Classifiers Through Order Statistics*, Nov. 2001., pp 1-21, Nov. 1, 2001.

Berge, T.B., *Seismic Inversion Successfully Predicts Reservoir, Porosity, and Gas Content in Ibhubesi Field, Orange Basin, South Africa*, Apr. 2002., pp. 338-348.

Pramanik, A.G., *Leveraging Seismic Technologies for Stratigraphic/Subtle Trap Exploration: An Overview*, Mar. 1999, pp. 1-22.

International Search Report (PCT US02/22078), Oct. 28, 2003.

Zeng, He Yao et al., *A Pattern Recognition Approach to Detect Oil/Gas Reservoirs in Sand/Shale Sediments*, Aug. 1992, pp. 462-465.

Vadim Mottl, Sergey Dvoenko et al., *Pattern Recognition in Spatial Data: A New Method of Seismic Explarations for Oil and Gas in Crystalline Basement Rocks*, Sep. 2000, pp. 315-318.

Balagurunathan, Yoganand, et al., *Morphological Granulometric Analysis of Sediment Images*, Apr. 18, 2001, pp. 87-99.

International Search Report (PCT/US03/22079), Oct. 17, 2003.

\* cited by examiner

PATTERN RECOGNITION TEMPLATE CONSTRUCTION APPLIED TO OIL EXPLORATION AND PRODUCTION

RELATED APPLICATIONS

This application is related to U.S. Pat. No. 6,466,923, entitled "METHOD AND APPARATUS FOR BIOMATHEMATICAL PATTERN RECOGNITION," filed on Apr. 29, 1998, and is a conversion of 60/395,959, entitled "PATTERN RECOGNITION APPLIED TO GRAPHIC IMAGING", filed on Jul. 12, 2002, by inventors Robert Wentland, et al., and U.S. patent application Ser. No. 10/308,933, entitled "PATTERN RECOGNITION APPLIED TO OIL EXPLORATION AND PRODUCTION", filed on Jul. 12, 2002 with the previous application, by inventors Robert Wentland, et al., and U.S. patent application Ser. No. 10/308,928, entitled "METHOD, SYSTEM, AND APPARATUS FOR COLOR REPRESENTATION OF SEISMIC DATA AND ASSOCIATED MEASUREMENTS," filed concurrently with the present application, and Ser. No. 10/308,860, entitled "PATTERN RECOGNITION TEMPLATE CONSTRUCTION APPLIED TO OIL EXPLORATION AND PRODUCTION" filed concurrently with the present application, and U.S. patent application Ser. No. 10/308,884 entitled "PATTERN RECOGNITION TEMPLATE APPLICATION APPLIED TO OIL EXPLORATION AND PRODUCTION" by Robert Wentland, et al, that was filed contemporaneously with this application, the latter five applications are hereby incorporated by reference herein for all purposes.

FIELD OF THE INVENTION

The present invention relates generally to oil exploration and production. More particularly, the present invention relates to constructing pattern recognition templates in combination with geological, geophysical and engineering data processing, analysis and interpretation for hydrocarbon exploration, development, or reservoir management on digital computers.

BACKGROUND OF THE INVENTION TECHNOLOGY

Many disciplines can benefit from pattern recognition. Disciplines where the benefit is greatest share characteristics and needs. Some common characteristics include large volumes of data, anomalous zones of interest that are mixed together with a large number of similar non-anomalous zones, timeframes too short to allow rigorous manual examination, and anomalies that manifest themselves in many ways, no two of which are exactly the same. Analysis of the data is usually done by highly trained professionals working on tight time schedules. Examples of these disciplines include, but are not limited to, hydrocarbon exploration and medical testing.

Exploring for hydrocarbon reservoirs is a very competitive process. Decisions affecting large amounts of capital investment are made in a time-constrained environment based on massive amounts of technical data. The process begins with physical measurements that indicate the configuration and selected properties of subsurface strata in an area of interest. A variety of mathematical manipulations of the data are performed by computer to form displays that are used by an interpreter, who interprets the data in view of facts and theories about the subsurface. The interpretations may lead to decisions for bidding on leases or drilling of wells.

A commonly used measurement for studying the subsurface of the earth under large geographical areas is seismic signals (acoustic waves) that are introduced into the subsurface and reflected back to measurement stations on or near the surface of the earth. Processing of seismic data has progressed hand-in-hand with the increased availability and capabilities of computer hardware. Calculations performed per mile of seismic data collected have increased many-fold in the past few years. Display hardware for observation by a human interpreter has become much more versatile.

When an interpreter makes decisions from the seismic, and other, data it is used with some knowledge of geology of the area being investigated. The decisions involve identification, analysis, and evaluation of the geological components of an oilfield, which include the presence of a reservoir rock, presence of hydrocarbons, and the presence of a container or trap. The rationale for the decisions that were made was based on both the geologic information and the data. That rationale is not generally documented in detail for seismic data analysis due to the large amount of data and information being analyzed. Therefore, it is difficult to review the history of exploration decisions and repeat the decision process using conventional procedures. The relative importance attached to the many characteristics shown in the seismic data and known from the geology is a subjective value that does not become a part of the record of the exploration process.

It is recognized that seismic data can also be used to obtain detailed information regarding producing oil or gas reservoirs and to monitor changes in the reservoir caused by fluid movement. Description of neural network modeling for seismic pattern recognition or seismic facies analysis in an oil reservoir is described, for example, in "Seismic-Pattern Recognition Applied to an Ultra Deep-Water Oilfield," *Journal of Petroleum Technology* August, 2001, page 41). Time-lapse seismic measurements for monitoring fluid movement in a reservoir are well known. The fluid displacement may be caused by natural influx of reservoir fluid, such as displacement of oil by water or gas, or may be caused by injection of water, steam or other fluids. Pressure depletion of a reservoir may also cause changes in seismic wave propagation that can be detected. From these data, decisions on where to drill wells, production rates of different wells and other operational decisions may be made. The neural network technique usually assumes that all significant combinations of rock type are known before analysis is started so that they can be used as a training set. This assumption is usually acceptable when analyzing fully developed fields but breaks down when only a few or no wells have been drilled. Common implementations of the neural network technique usually assume selection of the location of the geology of interest is an input that is determined prior to the analysis and often selects it using an analysis gate of fixed thickness. As the geology of interest is not always well known, the geology of interest should be a product of the analysis, not an input. Moreover, geology of interest rarely has a fixed thickness. The thickness varies significantly as the depositional process varies from place to place, sometimes by an amount that is sufficient to significantly degrade the result of the neural network analysis. This form of analysis includes information extraction and information classification in a single step that has little of no user control.

U.S. Pat. No. 6,336,943 B1 discloses a neural network-based system for delineating spatially dependent objects in the subsurface from seismic data. The application of neural networks to seismic data interpretation has been widely investigated.

U.S. Pat. No. 6,336,596 B1 discloses the use of a Voxel Coupling Matrix, which is developed using a finite number of neighboring voxels forming a textile. "Texture attributes" are developed. The attribute volumes are then used as inputs into an attribute-trace classification method to produce a seismic interpretation volume. The interpretation volume is displayed using distinct colors to represent various numbers of classes of reflection patterns present within the seismic volume. The aforementioned technique is an example of a class of image analysis called texture matching. These techniques have a significant trade off. While larger textiles (blocks of neighboring voxels) give better results, larger textiles smear out and blur the resulting image. Smaller textiles give better image resolution and edges but give poorer results. Success in finding a textile size that gives results of adequate quality with sufficiently small blurring is difficult often very difficult, especially when the rock layers are dipping rather than horizontally flat. The analysis classifies textures which is only one class of attributes the others being features and patterns.

U.S. Pat. No. 6,151,555 discloses a workstation computer system and an associated method and program storage device. U.S. Pat. No. 6,131,071 discloses a method for processing seismic data to provide improved quantification and visualization of subtle seismic thin bed tuning effects and other lateral rock discontinuities. A reflection from a thin bed has a characteristic expression and the frequency domain that is indicative of the thickness of the bed. The method may be applied to any collection of spatially related seismic traces. Other methods of presentation of seismic data are disclosed in the patent and technical literature.

While 3D seismic produces images of structures and features of the subsurface of the earth over very large geographical areas, it does not interpret those images. A trained geoscientist or specialist performs the interpretation. Unfortunately, reliance upon a relatively few qualified individuals increases the cost of the interpretation process and limits the number of interpretations that can be made within a given period. This makes current seismic interpretation techniques impractical for the analysis of the very large volumes of seismic data that are currently available. As a result of the large and growing amount of available data, there is a need in the art for a knowledge capture technique where the information in the 3D seismic data that the specialist looks at is captured by a pattern recognition process. Ideally, the pattern recognition process would be repeated for large amounts of data in a screening process, with the results displayed in an intuitive manner so that the specialist can quickly perform quality control on the results, and correct noise induced errors, if any.

What is needed is a way to capture in a template and reuse the information used to perform a pattern analysis including the computation of the feature, pattern, and texture extraction, the decision surfaces required to classify the data, and the parameters required to visualize the results. Moreover, a data analysis specialist should not be required to rely on analysis of non-visual measures of object characteristics. The information describing the visual characteristics of seismic data should be stored in a way that allows the data specialist to interact with the information to infer and extract geological information and to make a record of the exploration process. Templates with various uses and for various geological settings should be stored and retrieved for later reuse.

The above-identified needs are shared across many disciplines yet the specific nature and the characteristics of the anomalies vary across disciplines and sometimes within a single problem. Thus there is a need for a common method of analysis that is capable of being applied to a wide variety of data types and problems, yet it is capable of being adapted to the specific data and problem being solved in situations where required.

SUMMARY OF THE INVENTION

The present invention solves many of the shortcomings of the prior art by providing an apparatus, system, and method for identifying hyperdimensional fragments in a PDB that identify geological targets of interest, stored them as a part of a template, optimizing the templates, verifying the templates, and storing the templates of the known data in a template database ("PDB"). The present invention is applicable to a variety of applications where large amounts of information are generated. These applications include many forms of geophysical and geological data analysis including but not limited to 3D seismic.

However, it is not simply what is accomplished, but of equal importance are how it is accomplished and how the intermediate and final products are organized and stored. Specifically, it is the order in which the tools of the method of the present invention are used that provides the great benefits of the present invention. In general, the method of the present invention first builds a pattern database for a target data set with known targets and if possible known non-targets. It then builds a template for identifying targets using either a previously determined template or a set of default parameters. Next the method repeatedly tests the template, identifies cases where it fails, and refines the template until failures are minimized. The result is stored in a template database.

The present invention makes extensive use of templates for knowledge capture. Templates are feature, pattern, and texture decision surfaces that are used by the associated classifiers to find like structures. Known patterns that are captured in templates can then be compared, in an automated fashion, to new data to detect similar patterns and hence find the desired features in the new data. The templates also contain all of the processing and display parameters required to start with an initial data set and create a final product in a batch data computer run without human intervention.

BRIEF DESCRIPTION OF THE DRAWINGS

Referring now to the drawings, the details of the preferred embodiments of the present invention are schematically illustrated.

Figure 1A:
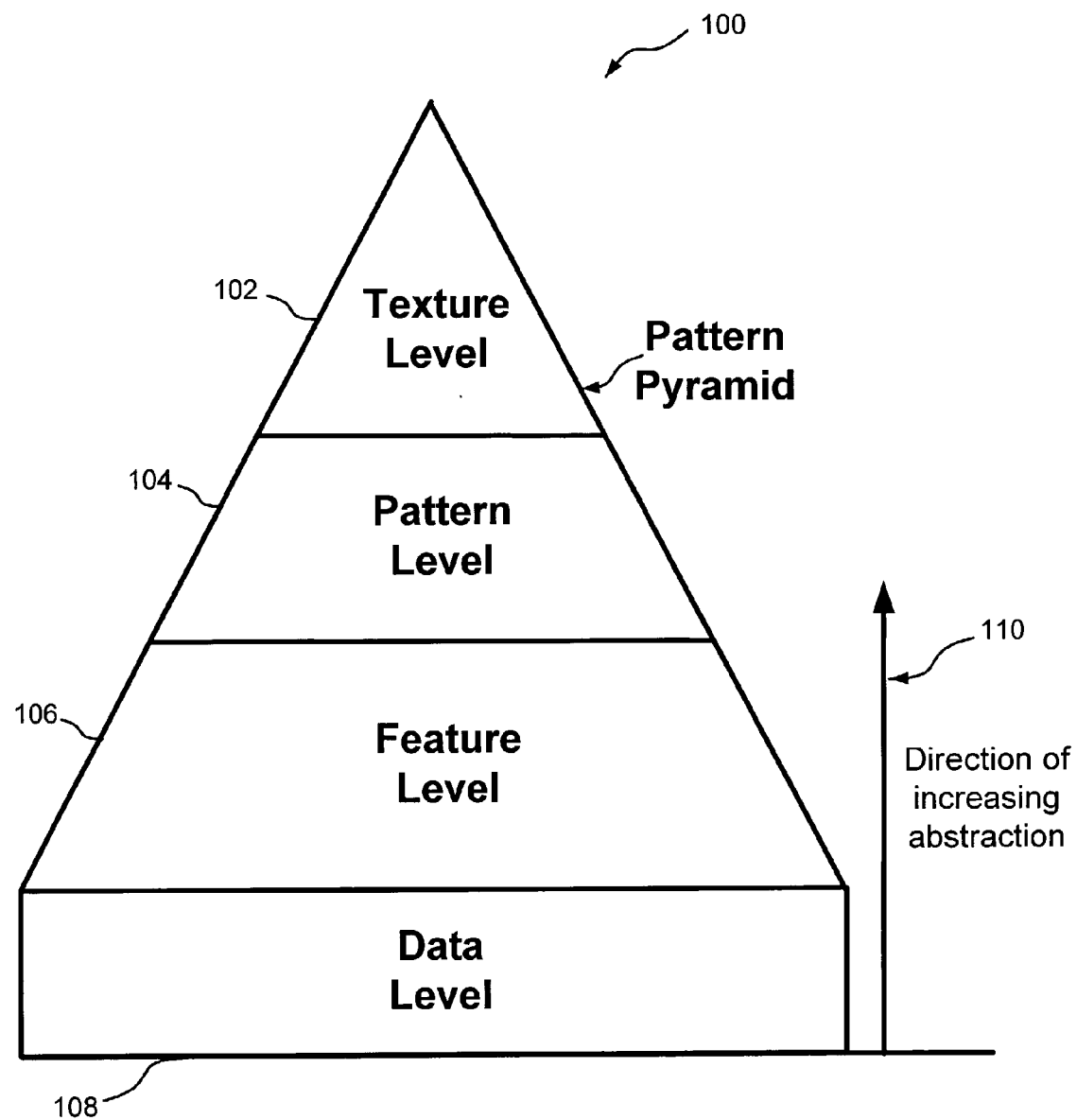
FIG. 1 is a block diagram of the apparatus of the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF THE PREFERRED EMBODIMENTS

The present invention includes a system for and method of extracting, organizing, and classifying features, patterns, and textures from a data set. The data and the information extracted therefrom, is organized as a pattern hierarchy and stored in a pattern database. The present invention also provides a system for the segmentation and the analysis of geological objects, for example, by identifying, extracting, and dissecting the best estimate of hydrocarbon filled reservoir rocks from band-limited acoustical impedance ("RAI") data computed from 3D seismic data or, if available, broadband acoustical impedance ("AI") computed from 3D seismic data, stacking velocities, well logs, and user supplied subsurface structural models. In addition the present invention includes a system for capturing the knowledge of the geoscientists operating the present invention in templates and reusing the templates for automated mining of large volumes of data for additional geological objects.

The following are definitions of terms that are used in the description of the present invention. Terms not defined herein retain their common usage.

Abstraction Process: An abstraction process is a process of successive identification of features, patterns, and textures within data and storing the results of each step into a layer within a pattern database.

Affinity: See Binding Strength.

Auto-track: An auto-track is the process of building objects by identifying spatially connected zones with a common attribute, collection of attributes, a common hyperdimensional fragment, or satisfying a template.

Attribute/Attributing: Intuitively, an attribute it is a characteristic or measurement of data. For the purposes of the present invention, it is defined as the measurements used to characterize the data at a given level of the pattern pyramid. In addition to characterizing the data, attributes can characterize the cuts or the boundary representation of objects after segmentation. Examples include local curvature measurements on the exterior of a segmented geological reservoir in geoscience, or colon in medical studies. Examples are features, patterns, and textures.

Attribute Location: The attribute location is the physical starting and ending location in the data set defining the location of an attribute.

Azimuth: See Dip/Azimuth.

Binding Strength: Binding strength is a threshold which is supplied by the operator that sets the degree of match required to determine if the known data matches the target data. The binding strength allows the present invention to recognize patterns in data that contains defects or noise or where a perfect match is not required. It is implemented as the threshold of values for each level of a hyperdimensional fragment.

Classifiers: Classifiers are a computational method (algorithm) that sorts out data into various sets with common characteristics or classes. See template.

Classification: Classification is the process of applying classifiers or templates. For the purposes of the present invention it is the process of identifying hyperdimensional fragments in the pattern database of the target data set that match, within a given binding strength, the hyperdimensional fragments of a known data set.

Cut/Cutting: Cut and cutting is the process of subdividing the data into a collection of one dimensional fragments.

Cutting Criteria: The cutting criteria are a set of methods and related parameters for creating fragments. The specific method depends on the nature of the data and the objective of the analysis. The simplest example is to choose a fixed length of data samples. A more complex method is to perform cuts based on changes in the data values such as sign changes, identification of edges, and others. Either of the above examples result in cuts with varying spatial lengths. Variable length cuts give rise to a topological surface that has measurable characteristics or attributes. While cuts of variable spatial lengths are possible, cuts of uniform length are also possible.

Data Mining: Data mining is the process of applying templates from a template database to one or many target data sets creating output objects, in scenes, that satisfy the template.

Decision Surface: The decision surface is a surface that separates two or more classes during classification. For the present invention it exists each of the feature level, pattern level, and texture level and is defined by a hyperdimensional fragment plus a non-zero binding strength that performs classification at each of the levels of abstraction. A template is a concatenation of the decision surfaces for each level of abstraction.

Dip/Azimuth: A dip or azimuth is a measurement system used to measure the orientation of geological formations. It refers to the orientation of a plane that is tangent to the surface of a rock layer at a given map location. They are two angles defining the orientation of a vector that points in a direction that maximizes the vectors dip magnitude and lies on the tangent plane. The dip angle is referenced to the horizon, which is a horizontal plane oriented so that its normal points toward the center of the earth at the location of interest. Dip is the angle the vector makes relative to the horizon. When the vector is projected onto the horizon plane, strike is the angle from the projected vector to a unit vector pointing north.

Earth Manifold: An earth manifold is, mathematically, a manifold is a topological space that is only locally Euclidean. It consists of a collection of local coordinate charts and a set of transformations between the charts. The transformations allow motion from one chart to the next. For the present invention the manifold is also required to be piecewise continuous. Intuitively it is a space that was distorted. One example of a manifold is the globe manifold, which is the 3D space representing the surface of the planet earth. It has been mapped using a set of maps (locally Euclidean coordinate charts) and a convention (overlapping of the maps) for moving from the edge of one map to the corresponding edge of the next (set of transformations). To describe the subsurface of the earth the 3D earth manifold follows the undulating geology. Each fragment, or a related coordinate neighborhood, has a coordinate chart defined by the local strike and dip of the rock layers (plus the normal to both) and rules for connecting them together along the rock layers. For problems where the space on which the attributes of interest occur has been distorted, pattern analysis is performed on a manifold.

Edge: An edge occurs where the data or attribute(s) of the data changes significantly at a given spatial location. In other words, an edge occurs at locations where the derivative of the attribute(s) has a peak. In reality, edges are often not sharp and are obscured by various noises in the data. Also, see segmentation and cutting.

Feature: A feature is the smallest interpretable and classifiable measurement that can be made on the data. It is one member of a feature set. Also, see feature set, visual feature set, and feature space.

Feature Location: The feature location is the physical starting and ending location that defines the spatial position of a feature.

Feature Set: A feature set is a set of feature attributes that represent the state of the data or image at each feature location in the image. Different feature sets are selected to classify data in various ways. Also, see feature, visual feature set, and feature space.

Feature Space: The feature space is, Mathematically and specifically topologically, a feature set is represented by a vector space (state space) where each axes of the space is a feature attribute. The smallest feature attribute set, which is also the computationally most efficient set, is described mathematically as a set, or basis of the vector space, where each member of the set is linearly independent. Linearly independent means that one axes, or set member, is not a linear combination of the other set members. Each feature attribute represents a degree of freedom of the image. When all of the degrees of freedom are represented as feature attributes, then the feature set, which is also the basis of the vector space, are described as spanning. Intuitively spanning means that a feature set can be recombined to exactly recreate the data from which it was measured. In practice a feature set capable of spanning the feature space is defined, but to reduce computation time only the features required to solve the problem are computed.

Fragment: A fragment is a one-dimensional interval that has a physical size and spatial location. It is the smallest interval at the given spatial location within which attributes can be measured. Fragments may be defined as having a fixed physical length or include a fixed number of attribute values. They may also have a variable physical length where the fragment is cut using cutting criteria that are a function of the data, attributes, or statistics of any lower level in the pattern pyramid. Variable length fragments usually lay between data value, attribute, or statistic edges. Fragments are cut at each of the feature, pattern, or texture levels of the pattern pyramid. Also, see fragment sequence.

Fragment Orientation: When the data being analyzed has more than one dimension a fragment orientation needs to chosen while cutting the data into fragments. For example 3D seismic is often measured in a three dimensional space with three axes, line, xline, and time. Other 3D data is often measured in three-dimensional space in three axes, x, y, and z. Thus, the fragment orientation can be aligned along any of these three axes. Another option is to align the fragment orientation along the earth manifold in the dip, strike, or normal (to the rock layers) direction, or in an alternate coordinate system, such as a geology or tissue aligned manifold.

Fragment Sequence: A fragment sequence is the sequence of data, attribute, or statistic values that occur within a fragment.

Global Statistic: A global statistic is a statistical comparison of the value of the attribute of interest at a particular location in a data set to the value of this attribute at all locations of the data set. Also, see statistic and local statistic.

Hyperdimensional Fragment: A hyperdimensional fragment is a fragment that extends vertically through the various levels of a pattern pyramid. It represents an ordered collection of attributes containing members from each level. At each level, the hyperdimensional fragment contains a single point and the associated attribute value. If required, a binding strength, which is a set of thresholds representing a range of values about the attributes at each level above the data level, can be used. It is defined for both known data and target data and is used for the simultaneous classification of features, patterns, and textures. See template and classification. Mathematically, topologically, it is a fiber view of the tangent spaces represented by the levels of the pattern pyramid. In terms of pattern recognition, it represents a classifier derived from the known data that is used to perform classification of the target data.

Known Data: Known data are a specified portion of a geophysical data set containing either a geological analog that is a known hydrocarbon deposit or an example composed of a subset of the geophysical data that is identified by a geoscientist as a potential hydrocarbon deposit. It is chosen to include primarily the item of interest and little else.

Local Statistic: Local statistic is a statistical comparison of the value of the attribute of interest at a particular location to the value of this attribute in a local coordinate neighborhood. The size of the path is operator selected. Also, see statistic and global statistic.

Object: An object is a spatially connected body within a scene that has a common attribute, hyperdimensional fragment (collection of attributes), or fits a template. Software objects are not to be confused with an object of the present invention. Software objects retain their standard meaning.

Object Space: An object space is a manifold space that represents either the exterior boundary of an object or the interior of an object. An example of a 3D manifold is the surface on the outside of an object. Another example is the 3D manifold representing rock layers within the earth.

Object Attribute: An object attributes are the measurable properties that is associated with an object's boundary representation or outside edge. An example of an object attribute is the local curvature of the exterior surface of an object.

Pattern: A pattern is a naturally occurring repetition of feature attributes in a fragment sequence. Also, see Pattern Space.

Pattern Database (PDB): A pattern database is a database that consists of several levels of attributes (usually features, patterns, and textures) within a data set. It can be a relational database containing the attributes. It can also be an object database containing the attributes as parameters and the reduction process computations as methods plus other parameters and methods if required for data handling and/or display.

Pattern Location: The pattern location is the physical starting and ending location that defines the spatial position of a pattern.

Pattern Pyramid: A pattern pyramid is a diagram that represents the pattern database. The pyramid sits on a broad rectangular base representing the data. A triangle sets on the base that decreases in width upward. The triangle has 3 levels consisting from bottom to top of features, patterns, and textures. The width at each level represents the number of fragments at that level, which decreases as the level of abstraction increases. Mathematically, topologically, the levels of the pattern pyramid represent tangent spaces of the data set.

Pattern Recognition: Pattern recognition is the analysis of data for making a decision. It involves making measurements on the data (pattern attributes and data statistics), analyzing the measurements (classification) and making a decision (computing a decision surface).

Pattern Space: Physical space is determined by a transformation from feature space to pattern space. Pattern space is an abstract vector space (state space) where each axes of the space represents a degree of freedom of the patterns in the image. Each location in the fragment sequence ($N_F$) and each member of the associated feature set represent the degrees of freedom ($N_M$). Thus, the pattern space has a dimension of $D=N_F \times N_M$. For example, a fragment sequence of length 3 with only 1 measured feature is a 3D space. There are several methods of assigning pattern attribute values. One is to identify clusters in pattern space, assign numbers to the clusters, and use the cluster number as the pattern attribute number. A second is to simply bin the space and assign the bin numbers to the pattern attributes. A third is to identify the location where the pattern maps into pattern space and use the coordinates as pattern attribute values. In practice it is computationally more efficient to estimate the pattern space by transforming only selected portions of the feature space. Also, see pattern.

Physical Space: Physical space is the space within which the data is measured or sampled. It is usually a Euclidean space. For problems where the space on which the patterns of interest occur has not been distorted, attribute calculations are performed on the physical space. For seismic data, the axes of the physical space are inline, xline, and time. The time axes refers to the two way travel time of sound through the earth. Sometimes time is replaced by subsurface depth.

Scene: Intuitively, a scene is a spatial region that is viewable and contains one or more objects. It is analogous to a room that is being viewed by an observer where the room contains furniture objects and people objects, all of which can be viewed. For the purposes of the present invention, a scene is a collection of objects. It is implemented as an integer data cube that contains integer numbers that represent object numbers plus a null value. Data points containing the null value represent null zones, which are not assigned to objects. Zones containing object numbers are assigned to the objects associated with the specific numbers.

Statistic/Statisizing: Statistic is a method of analyzing the attributes of each layer in the PDB for the purpose of analyzing the probability of a selected occurrence of the attribute occurring elsewhere in the entire data set or in a selected local coordinate neighborhood. Also, see local statistic, and global statistic. Statisizing is the process of applying the statistic method.

Target Data: Target data is a geophysical data set that is to be analyzed. Examples include seismic, electrical, magnetic, optical, or other form of measurements that measure rock properties. Target data is usually in the form of a 3D voxel cube although higher or lower spatial dimensions or analog data may also be used. The data that is most frequently used is 3D seismic data. To allow analysis of the rock layers rather than their interfaces, band-limited acoustical impedance is usually used. To maximize the quality of the analysis, the broadest bandwidth that can be reliably computed should be used. In terms of pattern recognition this is a data set to be classified into targets and non-targets by the hyperdimensional fragment which functions as a classifier.

Template: Intuitively a template is a sorting device for selecting a subset of a data collection where each member of the subset matches the template. It is implemented in software as a collection of one or more decision surfaces. For the purposes of the present invention, a template contains a hyperdimensional fragment representing the pertinent contents of the pattern database of a known data plus the binding strength. It is applied to the hyperdimensional fragments of the PDB of a target data set to identify targets. In addition, a template can contain decision surfaces that are related to object attributes that are properties of the objects boundary representation. An example is selecting objects for which the local curvatures lie within a given range of values as defined by decision surfaces in the template.

Template database: A template database is a database that contains one or more templates. It can be stored as data files, in a relational database, or in an object database.

Texture: Intuitively, a texture is the visual characteristic of a cloth that is composed of closely interwoven threads where the threads have unique patterns. It is a measurement of the order of repeated patterns in a series of spatially adjacent fragment sequences. Also, see Texture Space.

Texture Location: The texture location is the physical starting and ending location that defines the spatial position of a texture.

Texture Space: Texture space is, mathematically (topologically), an abstract vector space (state space) that is computed as a transformation from a pattern space to the texture space. The transformation is computed in the same way as transforming from feature space to pattern space with the exception that the input is a pattern space. In practice, it is computationally more efficient to estimate the pattern space by transforming only selected portions of the feature space. Also, see texture.

Visual feature set: A visual feature set is a feature set designed to classify data based on its visual appearance. An instance of a visual feature set is the one a shipping company uses to classify packages. The feature set is measurements of boxes including length, width, height, and shape (square, rectangular, etc.). An instance of a visual feature set that is used by seismic stratigraphers and interpreters to analyze band-limited acoustical impedance (inverted seismic) includes distance between zero crossings, maximum amplitude, and shape (skewed upward, skewed downward, single peak, multiple peaks, shoulder). Also, see features.

Voxel cube: A voxel cube is a 3D regular, ordered, quadmesh representing discreet measurements in a Euclidean space. A voxel cubes are also referred to as 3D pixels.

Pattern Recognition of Geoscience and Geological Data

The first step of the pattern recognition method of the present invention is feature extraction. Feature extraction comes in many forms, and tends to be specific to the type of problem encountered. For example, in seismic data analysis, geological features are extracted. Most traditional methods of feature extraction for seismic data involve mathematical algorithms that focus on the measurements of the sound rather than on the visual appearance of the displayed data. Most geophysicists, however, think of geology in a visual way, which makes analysis and interpretation of traditionally extracted seismic signal features difficult. Many other examples and uses for the feature extraction and imaging technique of the present invention will be apparent upon examination of this specification.

In general, a mathematical representation of features describes the local state of a system. The features are then represented as a vector in an abstract vector space or tangent space called the feature state space. The axes of the state space are the degrees of freedom of the system, in this case the features of the image. To minimize the amount of information required to represent the state of the image it is preferred that the features, axes of the state space, be linearly independent. The features have the capacity to "span the signal," or to describe all seismic attributes such that, for example, a geophysicist could accurately re-create the underlying geology.

Using seismic data as an example, geological features are extracted for performing pattern recognition on a seismic data set. Feature descriptors of seismic data tend to be one-dimensional, measuring only one aspect of the image, such as measuring only properties of the signal at specific locations in the signal. These feature descriptors taken singly do not yield enough information to adequately track geology. The relationship these measurements have with their local neighbors contains information about depositional sequences which is also very important geological information. Thus, the relationship features have with their neighbors and the total data set also needed to be analyzed.

The present invention utilizes a hierarchical data structure called a pattern pyramid that is stored in a pattern database (PDB). The pattern database employs a process that is based on DNA-like pseudo sequencing to process data and places the information into a pattern database. This database contains the data plus features and their relationship with the data and, in addition, information on how the features relate with their neighbors and the entire data set in the form of pattern, textures, and related statistics.

Intuitively the basic concept of the pattern pyramid is that complex systems can be created from simple small building blocks that are combined with a simple set of rules. The building blocks and rules exhibit polymorphism in that their specific nature varies depending on their location or situation, in this case the data being analyzed and the objective of the analysis. The basic building block used by the present invention is a fragment sequence built from a one-dimensional string of data samples. A pattern pyramid is built using fragment sequences (simple building blocks) and an abstraction process (simple rules). The specific definition of the building blocks, cutting criteria, exhibits polymorphism in that the algorithm varies depending on the data being analyzed and the goal of the analysis. Similarly, the abstraction process exhibits polymorphism in that the algorithm depends on the data being analyzed and the goal of the analysis.

A pattern database is built for known data, which functions as a reference center for estimating the locations in the target data that are potential hydrocarbon deposits. The estimation is accomplished by building a pattern database for the target data using the same computations as for the known data and comparing the pattern databases. The pattern pyramids have several levels of abstraction which may include features, patterns, and textures. The pattern pyramids are built using an abstraction process. Comparing the pattern databases is performed by defining a hyperdimensional fragment which associates the appropriate pattern information in the pattern database to the specific data samples from which they were computed. Classification of the target data into portions which match the known data and portions which do not match is accomplished by searching through the hyperdimensional fragments of the target data and comparing them to the hyperdimensional fragments for the known data (the classifier) to identify matches. Intuitively this means that for the target data to match the known data at any location not only do the data values need to agree but the data values must also be a part of local features, patterns and textures that also agree adequately. Thus, the present invention not only performs pattern recognition, but is also capable of performing feature recognition, texture recognition, and data comparison all at the same time as required for solving the problem.

To allow for natural variation or noise in the data, exact matches do not have to be required. This is accomplished by defining a binding strength or affinity which allows hyperdimensional fragments that are reasonably similar but not exactly the same to be classified as matched. The hyperdimensional fragment selected by the geoscientist operating the present invention captures the operators' knowledge of what is a desirable outcome, or in other words what a hydrocarbon filled reservoir looks like.

The hyperdimensional fragments and associate abstraction process parameters can be saved as a template into a template database. One or more templates can be checked out from the library and applied to large volumes of target data to identify targets. Targets which have been segmented out of the data set are stored as objects in a collection of objects called a scene. The objects, along with additional data the geoscientist adds to them, become a list of drilling opportunities.

Oil Exploration & Production Uses

This invention is capable of being used for geological, geophysical and engineering data processing, analysis and interpretation for hydrocarbon exploration, development, or reservoir management. It supports application for a variety of types of geophysical data. The present invention is flexible and extensible allowing adaptation to provide solutions to many geoscience problems.

For example, the present invention is capable of being used to analyze 3D seismic target data set with the goal of identifying the drilling target locations that represent potential hydrocarbon bearing reservoir rock. An ideal path to reaching this goal is to directly locate and analyze the hydrocarbons in reservoirs. Experience has shown that geology is diverse and complex and geophysical tools (other than drilling) do not directly measure the existence of hydrocarbons. Thus, oil finders build a set of corroborating evidence to decrease risk and increase the probability of drilling success, where success is defined as locating profitable hydrocarbon accumulations. Accomplishing this involves using several forms of geological and geophysical analysis, the goal of which is to identify sufficient evidence of the three basic components of an oil field, which are a reservoir, a charge, and a trap. Identifying a reservoir involves collecting evidence of the existence of a rock having the property that it is capable of holding sufficient hydrocarbons (adequate porosity) and the property that allows the hydrocarbons to be removed from the earth (adequate permeability). Identifying a charge involves collecting evidence that a hydrocarbon is present in the reservoir rock (bright spots, fluid contacts, and others). Another way is to identify a source rock that is or was expelling hydrocarbons and a hydrocarbon migration path to the trap. Identifying a trap involves collecting evidence that the earth structure and/or stratigraphy forms a container in which hydrocarbons collect forming structural traps, stratigraphic traps, or a combination of the two. When the identification of a reservoir, charge, and trap are complete the result is called a lead. After a full analysis of the reservoir, charge, and trap plus risk analysis, economic analysis, and drilling location selection the lead becomes a prospect that is ready to be drilled. The probability of success is highest when there is strong evidence that a reservoir, charge, and trap all exist, that they exist in the same drillable location, and that they can be profitable exploited. Our objective is to construct a pattern recognition process and associated tools that identify a location with all of the constituent parts of a lead and to quantify them to covert a lead into a prospect.

When it is applied to 3D seismic, the present invention identifies a potential reservoir through feature analysis, identifies hydrocarbon indications through pattern and texture analysis, and identifies the presence of a depositional process that deposits reservoir rock though texture analysis. It is also capable of identifying the presence of a trap by determining the presence of stratigraphic sequences that create stratigraphic traps through texture analysis and the determining the presence of structural trapping components through fault identification by edge identification. In addition it is capable of identifying the presence of a charge by locating stratigraphic sequences capable of expelling hydrocarbons through feature, pattern, and texture analysis plus determining the presence of faults in the neighborhood through fault identification. The final step of associating and validating the three components of an oil field is usually accomplished by a geoscientist.

After a lead has been identified the pattern database, along with appropriate visualization, could be used to perform reservoir dissection. This is a study of the internal characteristics of the reservoir to estimate the economics and convert the lead into a prospect.

After an oil field has been discovered the present invention is capable of being used to improve reservoir characterization, which is the estimation of rock properties (rock type, porosity, permeability, etc.), and fluid properties (fluid type, fluid saturations, etc.). Rock types and properties are a function of the geologic process that deposited them. In addition to information about the rock's acoustical impedance, the local features, patterns and textures contain information about depositional processes. Thus, the rock type and property estimations can be improved by including the feature, pattern, and texture information while estimating them.

In addition to the above seismic analysis methods, the present invention could be used for portions of data processing. Examples include but are not limited to, automatic stacking velocity picking, automatic migration velocity picking, noise identification, and noise muting.

The present invention is also capable of performing data set registration and comparison by successively aligning textures, patterns, and features. When applied to seismic it includes registering shear data to compressional data, registering 4D seismic data, registering angle stacks for AVA analysis, and others.

3D Seismic First Pass Lead Identification

This example performs first pass lead identification through simultaneous identification of a potential reservoir through feature analysis, identification of hydrocarbon indications through pattern and texture analysis, and identification of the presence of a depositional process, that deposits reservoir rock, though texture analysis. One way to do this is to use a known data set, which represents a successful lead or example lead, and compare the target data to known data. For this example, the goal is to identify reservoirs that occur in all forms of traps. Thus, it is preferable to disassociate the structural aspects of the earth from the stratigraphic, rock property, and hydrocarbon indication aspects. During this analysis, the structural aspects are not used. After the potential lead is identified using this example, the existence of a trap and charge will be determined.

For 3D seismic lead identification, the overall process starts by building a pattern database with successive levels of abstraction (features, patterns, and textures) for the known data. After the pattern database building process has been applied to a set of known data, and the minimum set of attributes that characterize the known data has been identified, the pattern database is applied to a set of data to be analyzed (the "target data"). The data of each set are subjected to the same series of steps within the abstraction process.

Before or during the comparison an affinity or binding strength is selected by the operator which determines how closely the known data has to match the target data to result in a target being identified. The binding strength helps to identify features, patterns, and textures in the target data that adequately match, but do not exactly match, the desired features, patterns, and textures in the known data.

Next the pattern database for the known data is compared to that of the target data. This is performed by identifying a hyperdimensional fragment from the known data pattern database that adequately and reasonably uniquely characterizes the known data. This hyperdimensional fragment relates the data at the location where the hydrocarbons were found or are expected to be found to the set of features, patterns, and textures which were derived from it. The hyperdimensional fragment and associated abstraction process parameters can be combined into a template. Templates can be used immediately or stored in a template database on one or more mass storage devices, and then retrieved when needed.

When templates are applied to target data sets the resulting targets are identified. These targets are stored as objects which represent leads. The leads objects are the locations in the target data sets which have a potential reservoir identified through feature analysis, potential hydrocarbon indications identified through pattern and texture analysis, and the potential presence of a depositional process that deposits reservoir rock identified though texture analysis. A collection of objects are stored in a scene. The scene represents the physical locations of the leads identified by the present invention in this example. Geological and other required properties of the leads can be stored with them.

Because the nature of the reservoirs, and possibly the hydrocarbons trapped in them, varies across each data set due to natural geological variations, it is often necessary to create more than one template to identify all of the leads any given area offers. A collection of templates can be created and stored in a template database. These may be sequentially applied to one or many target data sets in a process called data mining. When multiple templates are applied to the same target data set, the results are several scenes each containing lead objects. The scenes and their associated objects, one scene from each template, can be combined by performing Boolean operations on the scenes containing the objects creating one composite scene.

3D Seismic Pattern Pyramid

A 3D seismic data set exemplary embodiment of the layers of abstraction associated with the method of the present invention is illustrated in FIG. 1a. Each level of the pattern pyramid represents a level of abstraction. The input data lie at the bottom of the pyramid 100. The width at the base of each layer is generally indicative of the number of data samples or fragments involved within that stage of the method of the present invention. For each level of abstraction the smallest spatial unit that needs to be analyzed is a fragment. A fragment sequence is a one dimensional, ordered, spatially sequential, set of data values that cover multiple data samples and becomes larger with each higher level of abstraction. The total number of fragments for each level decreases as the level of abstraction increases leading to the pyramid-shaped illustration of FIG. 1a.

In the exemplary embodiment, the pattern pyramid 100 contains three layers of abstraction above the data level 108 (see FIG. 1a). The abstraction process is first applied to the data level to generate the feature level 106. Thereafter, the abstraction process is applied (at least once) to the feature layer data to generate the pattern level 104. Next, the abstraction process is applied (at least once) to the pattern layer data to generate the texture level 103. While the exemplary embodiment illustrated in FIG. 1a has three layers of abstraction above the data level 108, only one layer is required. On the other hand, should the analysis call for it, any number of layers may be generated above the data level 108. How many layers are generated, or how they are generated is problem-specific.

Figure 1B:
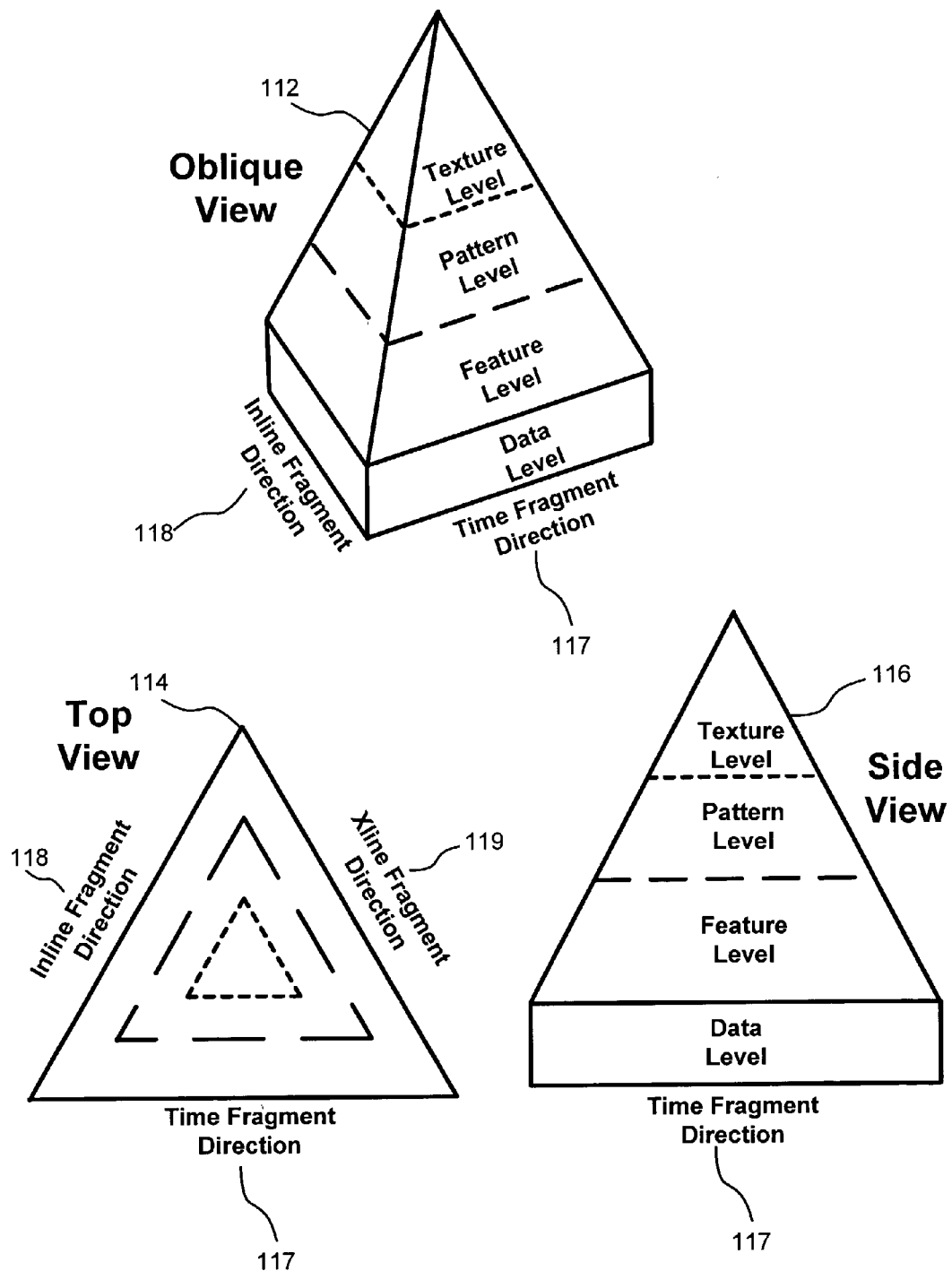

The pattern pyramid shown in FIG. 1a corresponds to a single fragment orientation during analysis. Some data sets with more than one spatial dimension may require analysis in more than one fragment orientation to achieve the desired results. Seismic data has a strong preferred direction caused by the geology of the subsurface of the earth. Another example of data with a preferred direction is wood grain. For these types of data, the analysis can give very different results depending on the fragment orientation relative to the preferred direction of the data. Successful analysis of this data might require using fragments with more than on alignment. To accomplish the analysis, sides can be added to the pyramid as shown in FIG. 1b. Each side is associated with a fragment alignment direction. The example in FIG. 1b shows three views (oblique 112, top 114, and side 116) of a 3D pattern pyramid. The example shows a pattern pyramid for 3D seismic data which has 3 spatial dimensions consisting of the inline axes, xline axes, and time axes. Each direction has an associated side on the pattern pyramid, an inline side 118, an xline side 119, and a time side 117. Because geology does not always align itself with the coordinate system on which the data is collected, this orientation will result in a pattern recognition analysis where the largest effect is the structure of the earth. When analyzing the trap component of an oil field this is very useful. If the goal is to not want to analyze geological structure and instead analyze the earth's stratigraphy, a different coordinate system is needed. To accomplish that goal, the fragments need to be aligned with the earth manifold, along dip, strike, and normal to the layers.

Figure 1C:
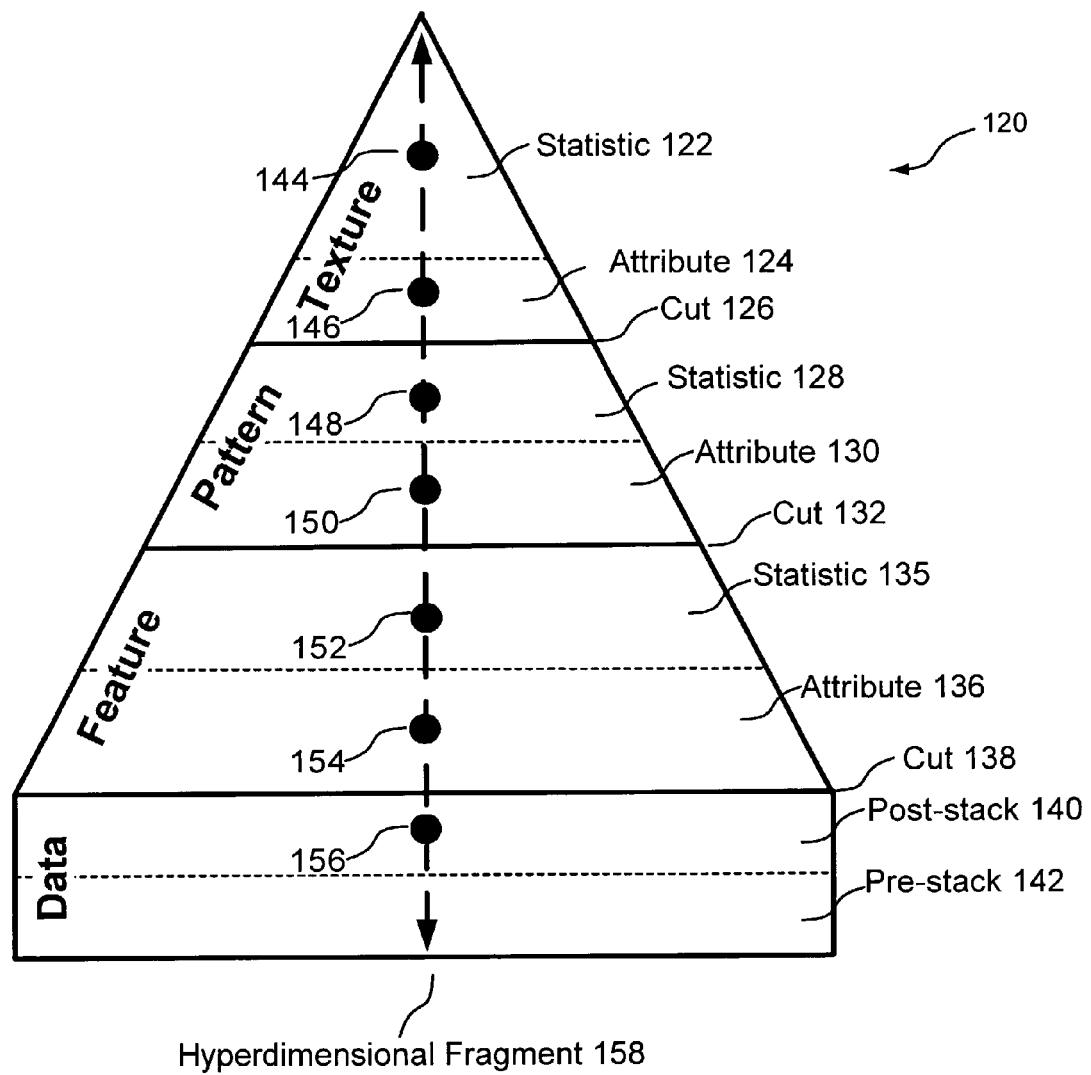
Figure 1D:
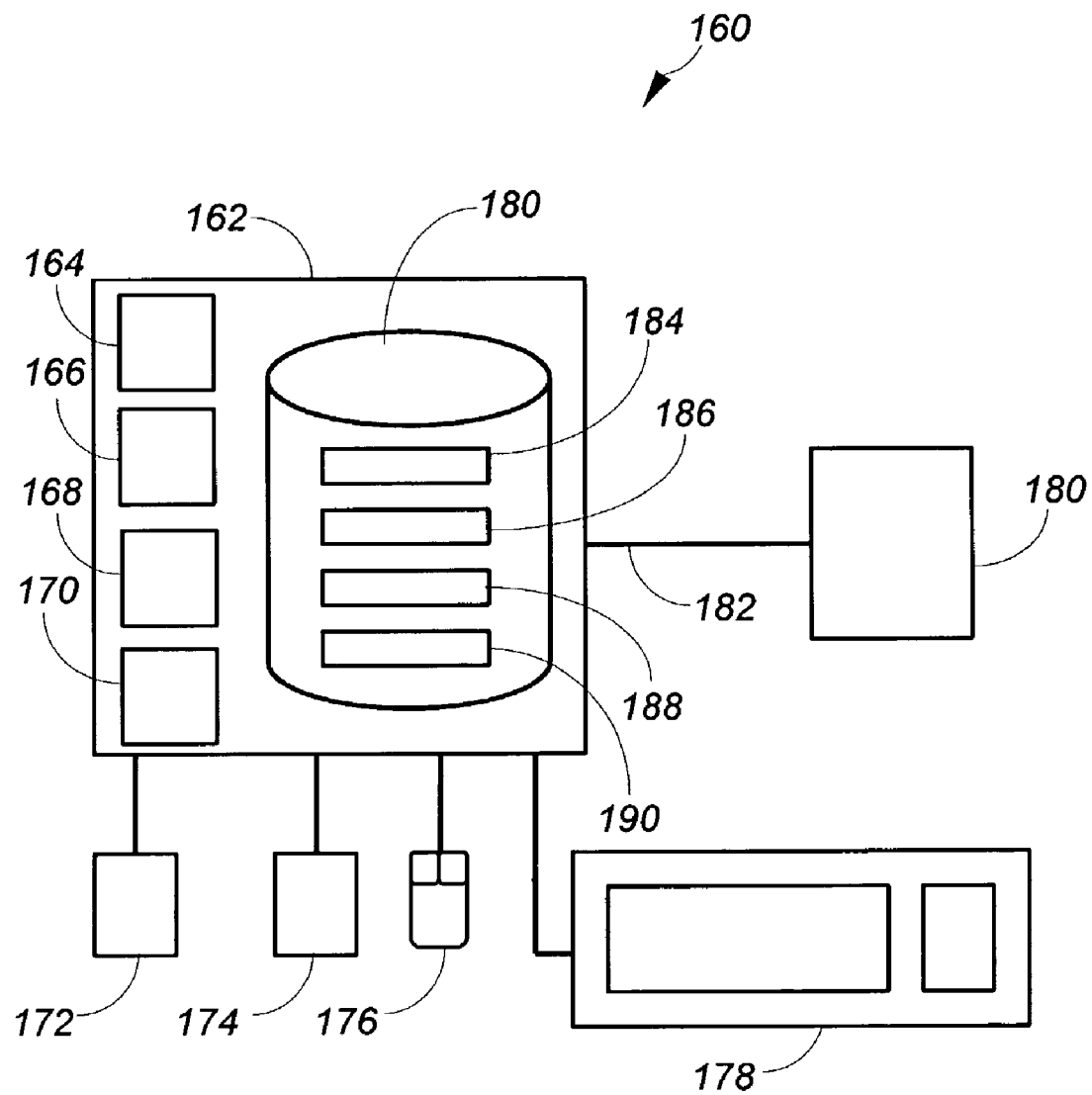

The pattern database building process identifies the minimum set of attributes (features, patterns, and textures) of one or several examples of known data so that, when the known data is compared to the target data, only the desired characteristics need to be considered. The results of each step are represented in the pattern pyramid 120 as shown in FIG. 1c and are stored in the pattern database. The process starts at the data layer which for seismic data can contain a lower layer of pre-stack seismic data 142 setting under a layer of post-stack seismic data 140. Above the data layer at the base, the pattern database contains several layers of abstraction that are built sequentially starting at features, proceeding through patterns, and finally ending with textures, the highest level of abstraction. There may be one or several layers of each type. Not all of the layers are required. The pattern database can be built only up to the pattern pyramid level required to solve the problem. The creation of each layer includes one or more steps of cutting, computing attributes, and computing statistics. Each layer has a cut 138, 132, and 126, computed attributes 136, 130, and 124, plus computed statistics 135, 128, and 122. The precise methods of cutting, computing attributes, and computing statistics changes from layer to layer, and can change within the layers. They specific computations in the abstraction process are designed to capture the minimum set of feature level attributes 136, feature level statistics 135, pattern level attributes 130, pattern level statistics 128, texture level attributes 124, and texture level statistics 122 required to solve the problem.

Hyperdimensional Fragment and Binding Strength

FIG. 1c illustrates how a particular point of space in the input data 140 and 142, represented by the point 156, has corresponding points 154 and 152 in the feature layer, 150 and 148 in the pattern layer, plus 146 and 144 in the texture layer. The ordered set of points 156, 154, 152, 150, 148, 146, and 144 forms a trajectory called a hyperdimensional fragment of the data point 156 in question. The pattern pyramid has a set of hyperdimensional fragments that associate each data sample to the features, patterns, and textures to which it contributed. Because the type of abstraction analysis is problem specific, so too is the resultant hyperdimensional fragment.

When comparing the known data hyperdimensional fragment to the collection of target data hyperdimensional fragments the amount of similarity required to consider them matched is determined by the binding strength or affinity. This invention implements the concept of a binding strength by setting a range of acceptable feature, pattern, and texture values at each pattern pyramid level that the hyperdimensional fragment passes through. The result is that exact matches are no longer required but similar matches are allowed.

When the above-described process is completed, the hyperdimensional fragment and associated threshold becomes a template that is used for object identification. Making a comparison between the known data and the target data is accomplished by applying the template to the target data. The comparison is accomplished by searching through all of the hyperdimensional fragments in the target data set and determining if the feature, pattern, and texture values though which they pass are the same within the binding strength as the values in the known data hyperdimensional fragment. Templates can be stored in a template database and retrieved for later use on any target data set.

Scenes and Objects

The result of applying a template to a target data set pattern database is a scene that contains null values where matches did not occur and a value representing matched where matches did occur. The next step is to identify all data connected points where matches occurred and assign them to an object. This is accomplished by stepping through all of the points that are marked as matched and performing an auto-track that assigns all connected points that are marked as matched to an object. This is repeated until all points that are marked as matched have been assigned to connected objects. The result is a scene containing connected objects that represent potential hydrocarbon deposits. These objects represent a simultaneous analysis of how well they represent a potential reservoir through feature analysis, represent hydrocarbon indications through pattern and texture analysis, and include the presence of a depositional process that deposits reservoir rock though texture analysis.

Objects can have associated properties. For example, a 3D manifold (also referred to as a shrink-wrap) can be placed on the boundary (outside edge) of an object forming an object space. Topological properties of the object surface, such as local curvature, can be measured and stored as an object property.

Next, the scene, the collection of objects, is then analyzed in a quality control step to determine if the system is correctly creating the desired objects. If the system creates the expected objects, but the objects are incomplete or obscured due to seismic noise, the binding strength is modified and the data mining is repeated. If the expected objects are not created or too many objects which are false positives are created the amount of information in the PDB or associated parameters are modified, a new template is created and the data mining is repeated.

Finally the collection of objects, in the scene(s), is viewed to manually identify and remove any remaining false positives. The goal is to minimize the work in this step by a good choice of PDB construction.

Data Mining

Templates can be precomputed from known data sets, stored in a template database, and used the pattern databases for one or many target data sets creating resultant scenes containing objects which satisfy the templates. This process is often referred to as data mining. The collection of objects becomes a lead inventory.

PDB Comparison, Objects, and Scenes

For the 3D seismic first pass lead identification example, the PDB comparison is performed by comparing hyperdimensional fragments. The binding strength is specified for each level of the pattern pyramid where it was not already specified during pattern database construction usually by using the quick clustering technique above. When this step is performed for the first time it is often performed interactively during visualization of a target data set and the related pattern database. When the optimal binding strength has been chosen, the template is applied to the target data set. This step is often referred to as applying a scene construction tool. After this is accomplished the spatially connected objects are computed using another tool which is also referred to as a scene tool.

Data Mining and Lead Inventory

For the 3D seismic first pass lead identification example the template computed above is saved in the template database. The appropriate templates are checked out and applied to all of the data in the geographical region being analyzed. The resulting scenes and associated templates are combined using Boolean operations which are usually referred to as Boolean scene tools. The final product is a lead inventory which is associated with a scene containing a list of multiple leads (objects) and lead parameters. The lead parameters include lead names, locations, spatial sizes, global statistics, local statistics, and other useful information as required by the operator.

Template Contents

The template contains the decision surfaces required to identify targets in data sets. The decision surfaces may be defined in many ways. One example is that the decision surfaces are defined by a list of target hyperdimensional fragments, a list of non-target hyperdimensional fragments, and a binding strength. Another example is a collection of ranges defined by the minimum allowed value and maximum allowed value for each pattern pyramid level. Other forms of decision surface definitions or combinations of more than one form can be used.

In addition the template needs to contain associated information which allows the PDB to be created. This includes the definition of the PDB contents including all parameters and information required to create the appropriate PDB on which the template is applied.

In addition the template needs to contain associated information which allows the results of applying the template plus the associated PDB to be visualized and analyzed for quality control. Examples include color tables, opacity tables, and other display parameters that may be used to display each of the levels of the PDB. In addition it might contain false color image combinations of information from several layers of the PDB. Other display information can be included.

The Implementation of the Present Invention

The present invention is preferably implemented as a set of one or more software processes on a digital computer system. However, the present invention may also be implemented purely in hardware, or may be virtually any combination of hardware and software. Moreover, the following description of the apparatus represents the best mode for practicing the present invention, and the elimination of one or more of the components described herein may incur a corresponding reduction in the effectiveness or the capability of the present invention. Similarly, future computer components may offer increased performance, or integration of tasks leading to enhanced performance of the present invention with the same or fewer numbers of components.

The Apparatus of the Present Invention

FIG. 16 illustrates an enhanced personal computer ("PC") 160 used for extracting features from a signal. Enhanced PC 160 includes a main unit 162, a high-resolution display 180, a VGA cable 182, an optional CD-ROM drive 172, an optional 8 mm (or other type) tape drive 174, a mouse 176, and a keyboard 178. Main unit 162 further includes one or more CPUs 164, a high-speed memory 166, a network card 168, a high-speed graphics card 170, and an internal and/or external hard drive 180. The hard drive 180 can be replaced with any suitable mass storage device, such as a storage area network ("SAN"), RAM, tape, drum, bubble or any other mass storage media. Hard drive 180 stores, for example, a seismic and SEG-Y format database 184, a pattern database ("PDB") 186 (also called a knowledge hierarchy), well data, culture data, other supporting adapt and documents, one or more applications 188, and a template library 190.

High-speed memory 166 is used to accelerate processing. High-speed graphics card 170 is preferably an ultrahigh-speed graphics card like the Intense 3D Wildcat (manufactured by 3DLabs of Huntsville, Ala.). High-resolution display 180 is the highest resolution display currently available in order to support the applications, which are intensely graphic in nature, and is electrically connected to main unit 162 by VGA cable 182. Also electrically connected to main unit 162 are CD-ROM drive 172, 8 mm tape drive 174, mouse 176, and keyboard 178.

In operation, seismic data enters the enhanced PC 160 via, for example, the 8 mm tape drive 174, the CD-ROM drive 172 and/or the network card 168. This seismic data is stored in, for example, SEG-Y format in database 184 and is processed by CPU 164 using applications 188, with mouse 176, and keyboard 178 as input devices and high-speed memory 164 to facilitate processing. The processed seismic data is then stored in a PDB 188 format.

After pattern analysis, a PDB contains a collection of data volumes. The collection includes a 3D seismic data volume, multiple associated pattern, feature, texture volumes, and multiple scene volumes. The data values are stored so that they can be addressed as spatially vertical columns or horizontal slabs with the columns and slabs made up of subsets called bricks. A stack of bricks that extend from the top of the cube to the bottom is a column. A mosaic of bricks that extends horizontally across the volume is a slab. The brick size is chosen to optimize data access, for example, 64 by 64 samples in size. The samples are 8-bit integer, 32-bit floating point, or any other desired format. Each volume contains metadata including:

--- the volumes name;
physical dimensions in slice coordinates (index numbers), seismic survey coordinates, and world (map) coordinates;
labels for each spatial axes;
physical units for the world coordinates of each axes;
registration points associating the slice coordinates to the seismic survey coordinates;
registration points associating the seismic survey coordinates to the world coordinates;
default display properties appropriate to the type of data:
   default color table; and
   default opacity table;
sample value label;
sample value scaling properties (additive minimum and maximum values of scaled sample values);
history including date and text entry including:
   source from which the adapt was obtained;
   operations which were performed on the data by the present invention;
   description of the data; and
   user provided notes;
minimum and maximum sample values, plus histogram of data values;
locking keys and other data management keys and pointers; and other associated information.

---

The PDB collection, and associated metadata, can be stored as files on a file system, as information in a database, or as a combination of the two.

After modification, a seismic template is created for each geoscientist, and this template is stored in template library 190. During processing, the seismic data is viewed on the high-resolution display 180. After further processing, the seismic data is stored in template library 190, and output to 8 mm tape drive 174 or CD-ROM 172, or transmitted via the network card 168.

The methods are executed using object-oriented programming, which allows reflection coefficient ("RFC") data, acoustic impedance ("AI"), and other calculated feature extraction information to be stored either as parameters and methods or as results, according to the available memory and processing capability of the host system. If the full results of the seismic data analysis are stored in the PDB 188, the memory requirement is measured in terabytes, which is more memory capacity than many systems have. If the parameters and methods for generating the seismic analysis are stored instead, the system must have enormous processing capability and high-speed memory 166 in order to rapidly calculate the analyzed seismic data when the seismic object is executed.

Method of Creating a Template

Figure 2:
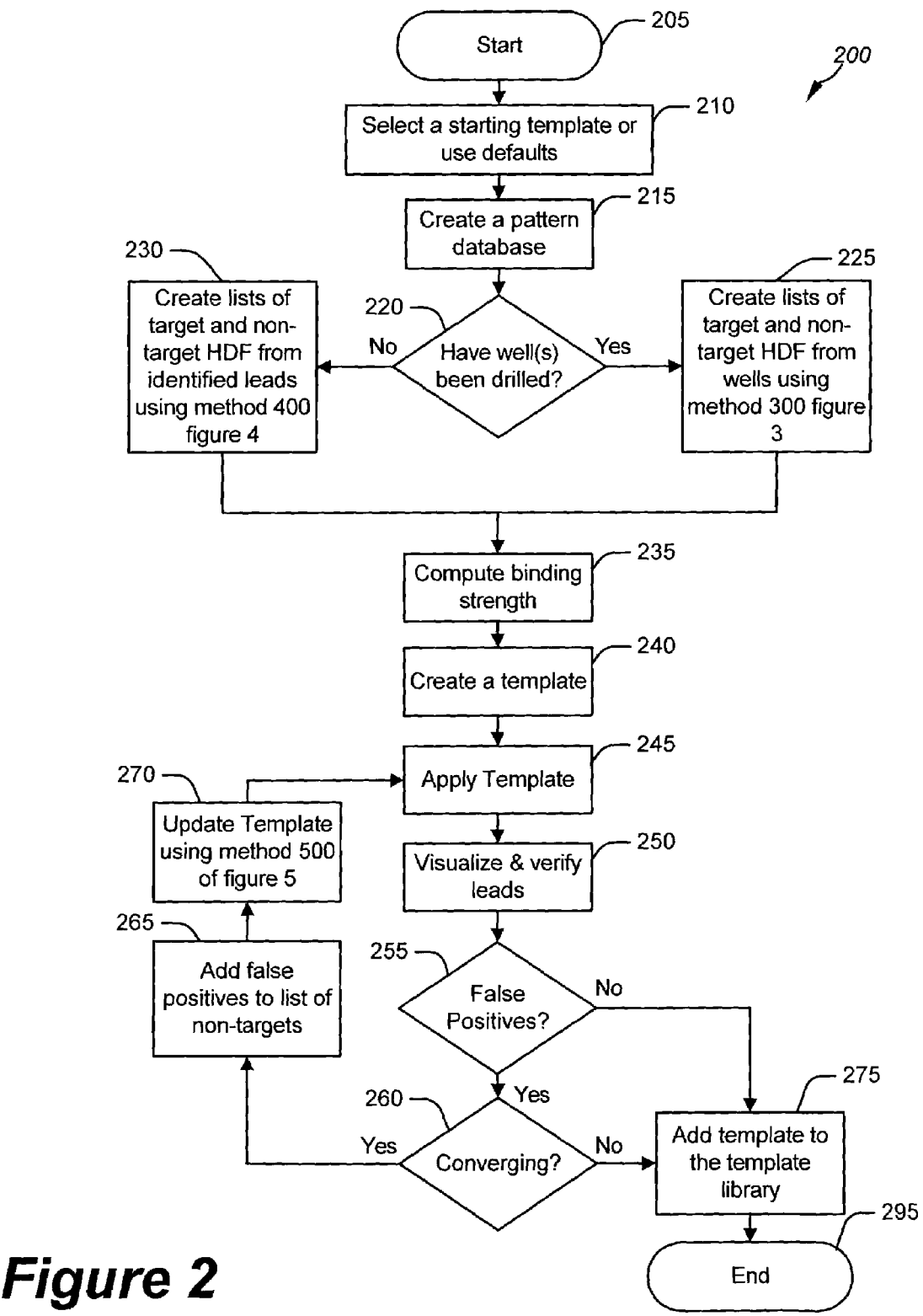
FIG. 2 is a flowchart illustrating an embodiment of a method of creating a template.

The present invention employs the above-identified apparatus for various purposes. The method of the present invention will now be illustrated via a method of creating a template of the present invention as illustrated in FIG. 2 by method 200. In practice the operator might perform only portions of this method or variations of the method as is appropriate to the problem being solved and the operator's individual working style. This is a trial-and-error method which starts at a best guess starting point and modifies the pattern recognition database contents and parameters until a solution is reached.

Step 205. Method 200 starts. The method starts generally at step 205.

Step 210: Select a starting template or use defaults. In this step, the operator creates a starting point for construction of a pattern database. During this method the starting point will be refined to create a PDB that is adapted to solving the specific problem at hand. The starting point could be provided by a pre-existing template taken from the template library. This is done by selecting a template that was built to work in a similar geological setting. If a previously built template does not exist the staring point could be the set of application defaults. The rate at which this trial-and-error method converges on a solution depends on how close this staring point is to the best solution.

Step 215: Create a Pattern Database. In this step, the operator uses the a pattern recognition technique to create the pattern database.

Step 220: Have wells been drilled? In this decision step, the system operator determines if wells have been drilled within the area covered by the seismic data. If wells have been drilled, then the method 200 proceeds to step 225; otherwise, the method 200 proceeds to step 230.

Step 225: Create lists of target and non-target Hyperdimensional Fragments ("HDF") from wells using method 300 of FIG. 3. In this step, the operator performs method 300 of FIG. 3. When this step is completed method 200 proceeds to step 235.

Step 230: Create lists of target and non-target HDF from identified leads using method 400 of FIG. 4. In this step, the operator performs method 400 of FIG. 4.

Step 235: Compute binding strength. In this step, the operator analyzes the list of target and non-target hyperdimensional fragments ("HDF") to compute the binding strength. Binding strengths can be defined in many ways with the specific definition depending on the problem being solved. An example of a binding strength is to compute a range around the HDF values for each level of abstraction in the pattern pyramid within which any other HDFs are considered to be a match. A common way to do this is to use either the local statistic or global statistic to determine the mean as the HDF and some percentage of the standard deviation to set the binding strength.

Step 240: Create a template. In this step, the operator creates a template.

Step 245: Apply template. In this step, the operator uses the pattern recognition method, such as the one applied in step 215. If the pattern database contents as described in the template is the same as the current pattern database, then the pattern recognition method is skipped.

Step 250. Visualize and verify the leads. In this step, the operator uses the Chroma Vision application to visualize the scene created by step 245. The application is instructed to use the default visualization parameters from the template. If the operator wishes, other pattern database information can be viewed with the scene displayed as an overlay using the default false color images and visualization parameters from the template. The operator is optionally able to modify the display of the other pattern database information to create custom displays as required to verify the leads.

Step 255: False positives? In this decision step, the system operator determines if the scene contains objects which are false positives. If this step the operator uses his previous experience and knowledge of geological processes to identify objects which have the same seismic response as targets but are in fact not a desired target. If false positives are identified, then the method 200 proceeds to step 260; otherwise, the method 200 switches to step 275.

Step 260. Converging? In this decision step, the system operator determines if the decisions made in step 270 of the analysis loop consisting of steps 245, 250, 255, 260, 265, and 270 are causing a reduction in the number of false positives and if not are further reductions possible. If the analysis loop is still converging on an optimal solution, then the method 200 proceeds to step 265; otherwise the best template has been found and the method 200 switches to step 275.

Step 265: Add false positives to list of non-targets. In this step, the operator adds the false positives to the list of non-targets.

Step 270: Update template using method 500 of FIG. 5. In this step, the operator updates the template. In this step, the operator performs method 500 of FIG. 5. Then method 200 switches to step 245.

Step 275: Add template to the template library. In this step, the operator executes a software application which places the template by this method into a template library.

Step 295: Method 200 ends. The method 200 ends generally at step 295.

Figure 3:
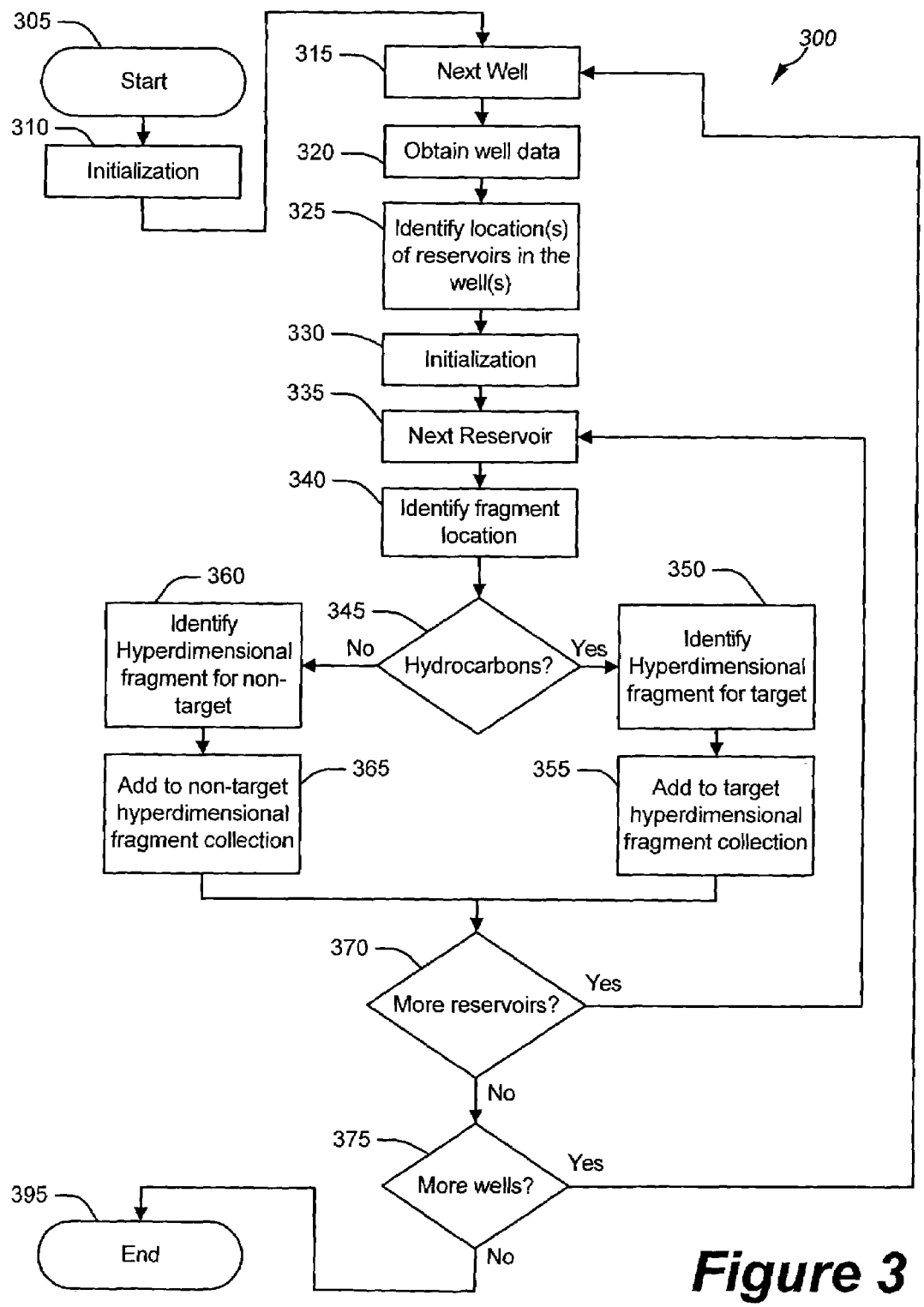
FIG. 3 is a flowchart illustrating an embodiment of a method of identifying target and non-target hyperdimensional fragments when well data is available.

Method of Identifying Target and Non-Target Hyperdimensional Fragments when Well Data is Available The present invention employs the above-identified apparatus for various purposes. The method of the present invention will now be illustrated via the identifying target and non-target hyperdimensional fragments when well data is available method of the present invention as illustrated in FIG. 3 by method 300. This method is usually performed as step 225 of method 200.

Step 305: Method 300 starts. The method starts generally at step 305.

Step 310: Initialization. In this step, the operator or an application the operator is executing prepares a list of wells which penetrate the earth within the boundaries of the 3D seismic being analyzed. A pointer or selector for the list is initialized so that the first time step 320 is executed the first well in the list is selected.

Step 315: Next well. In this step, the operator or the application proceeds to the next well in the list which is the first well when this step is performed for the first time.

Step 320: Obtain well data. In this step, the operator obtains the well logs and related data. If the well data has not been previously processed and analyzed the processing and analysis is performed by a petrophysicist.

Step 325: Identify location(s) of reservoirs in the well(s). In this step, the operator prepares a list of reservoir locations in the well. The entries in the list are obtained from the petrophysical analysis results, from recorded perforation zones, or by analyzing the well data.

Step 330. Initialization. In this step, the operator or an application the operator is executing sets a pointer or selector for the reservoir list to initialize it so that the first time step 335 is executed the first reservoir in the list is selected.

Step 335: Next reservoir. In this step, the operator or the application proceeds to the next reservoir in the well. It is the first reservoir when this step is performed for the first time with a new well.

Step 340: Identify fragment location. In this step, the operator or the application the operator is executing identifies the feature fragment location in the PDB which is in the same spatial location as the reservoir in the well.

Step 345: hydrocarbons? In this decision step, the system operator determines if the well encountered hydrocarbons at the reservoir being analyzed. If the reservoir contains hydrocarbons, then the method 300 proceeds to step 350; otherwise the method 300 switches to step 360.

Step 350: Identify hyperdimensional fragment for target. In this step, the operator or the application the operator is executing identifies the hyperdimensional fragment for the target. The hyperdimensional fragment consists of the data value(s) plus all associated feature value(s), pattern values (s), texture value(s) and associated statistics for all levels in the PDB.

Step 355: Add to the target hyperdimensional fragment collection. In this step, the operator or the application the operator is executing adds the hyperdimensional fragment to the collection of target hyperdimensional fragments and then the method 300 proceeds to step 370.

Step 360: Identify hyperdimensional fragment for non-target. In this step, the operator or the application the operator is executing identifies the hyperdimensional fragment for the non-target. The hyperdimensional fragment consists of the data value(s) plus all associated feature value(s), pattern values(s), texture value(s) and associated statistics for all levels in the PDB.

Step 365: Add to the non-target hyperdimensional fragment collection. In this step, the operator or the application the operator is executing adds the hyperdimensional fragment to the collection of non-target hyperdimensional fragments.

Step 345: More reservoirs? In this decision step, the system operator or the application the system operator is executing determines if there are more reservoirs in the well being analyzed. If there are more reservoirs, then the method 300 returns to step 335; otherwise the method 300 continues to step 375.

Step 375: More wells? In this decision step, the system operator or the application the system operator is executing determines if there are more wells in the well list. If there are more wells, then the method 300 returns to step 315; otherwise the method 300 continues to step 395.

Step 395: Method 300 ends. The method 300 ends generally at step 395.

Figure 4:
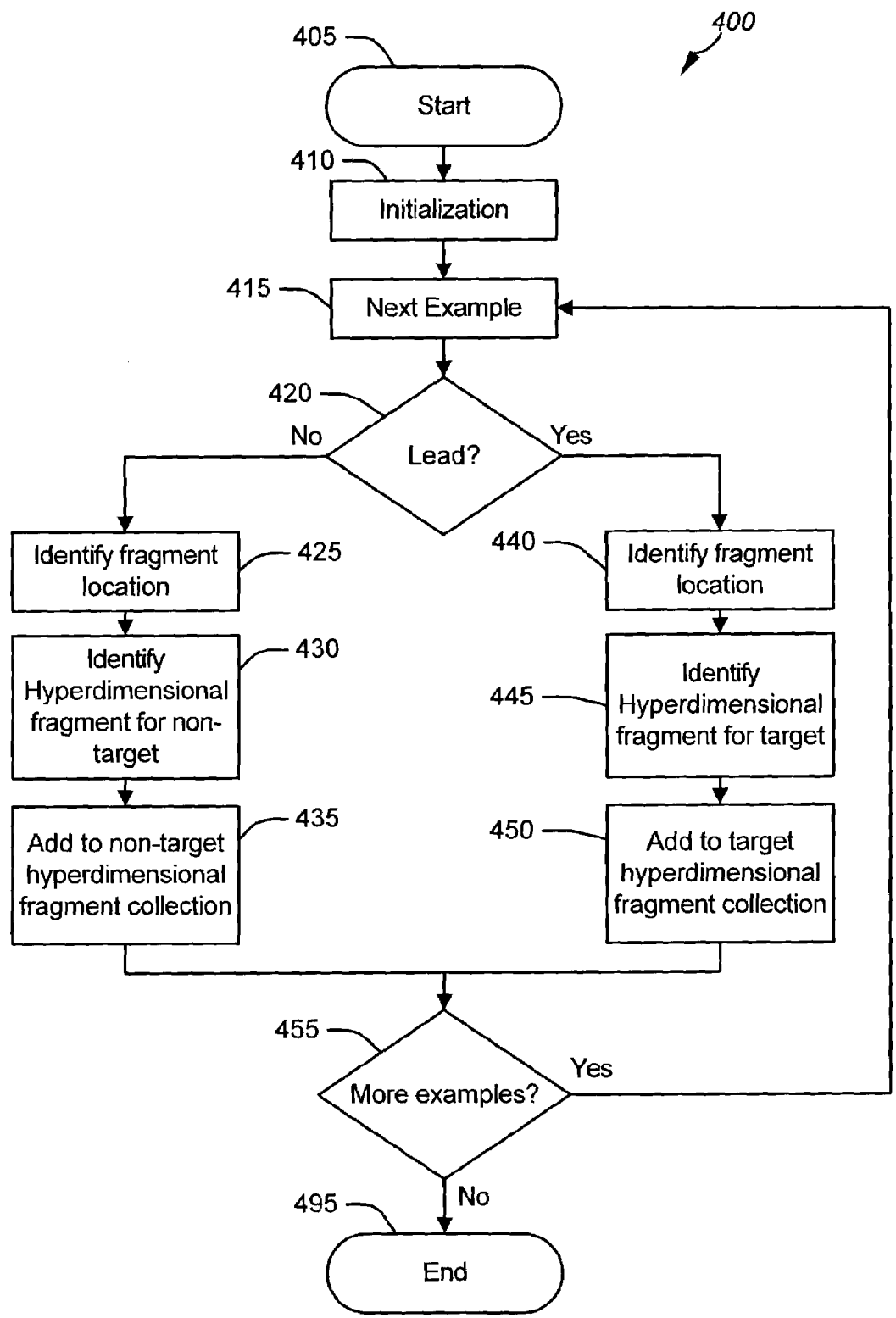
FIG. 4 is a flowchart illustrating an embodiment of a method of identifying target and non-target hyperdimensional fragments in the absence of well data.
Figure 5A:
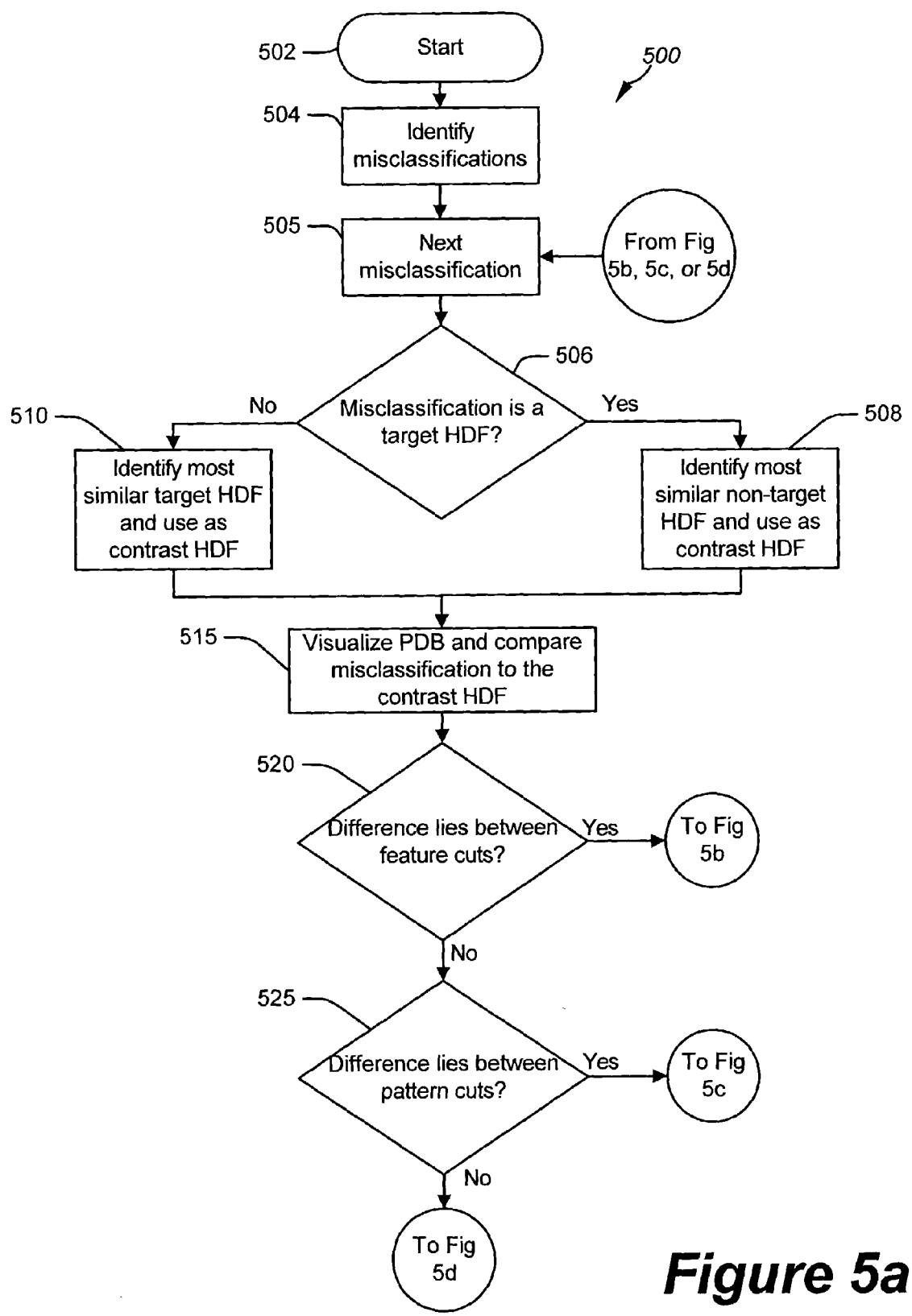
FIG. 5a is a flowchart illustrating an embodiment of a method of modifying a template to reduce misclassifications or false positives.
Figure 5B:
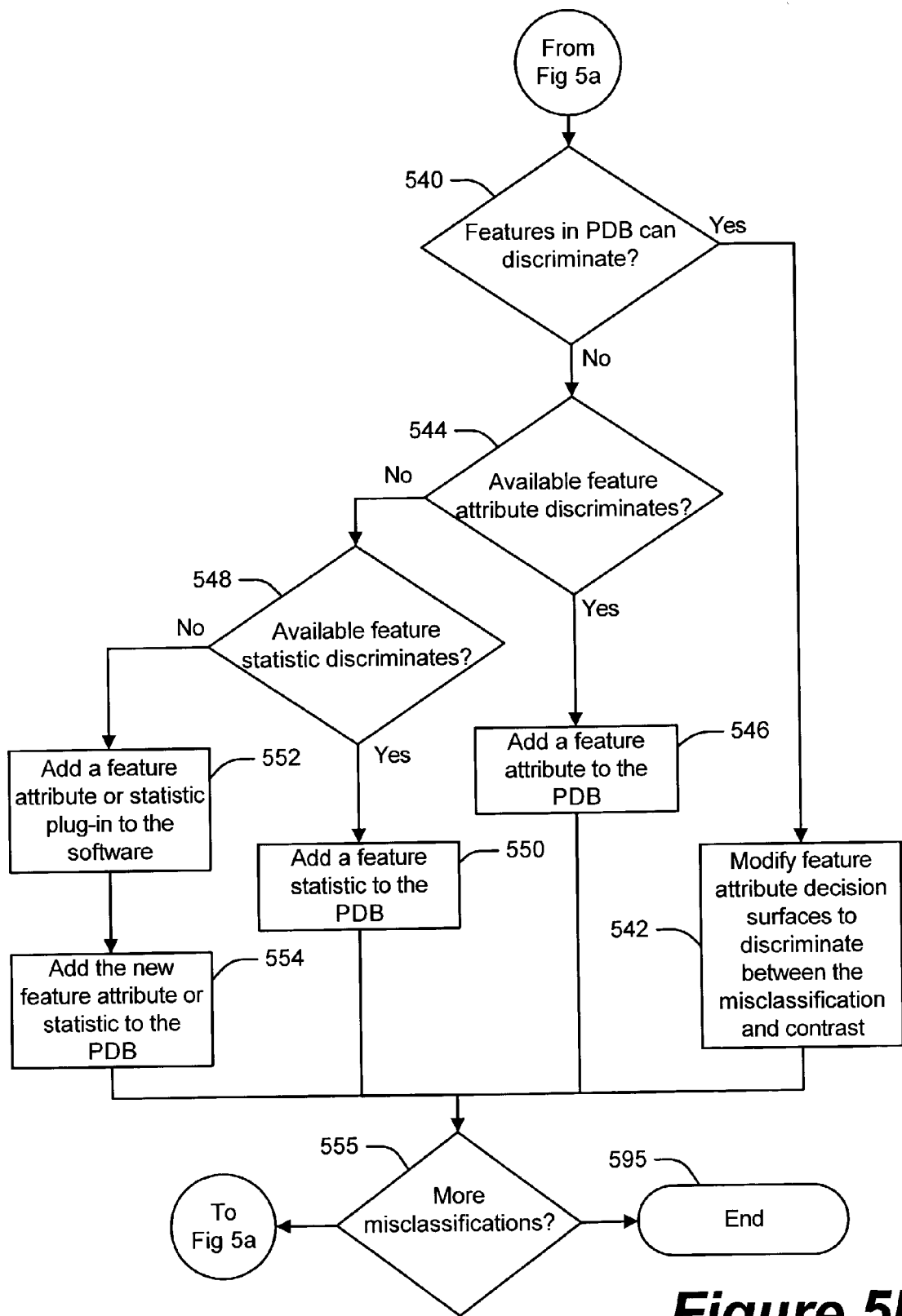
FIG. 5b is a flowchart illustrating an embodiment of a method of improving feature attribute and statistic selection and related decision surface selection.
Figure 5C:
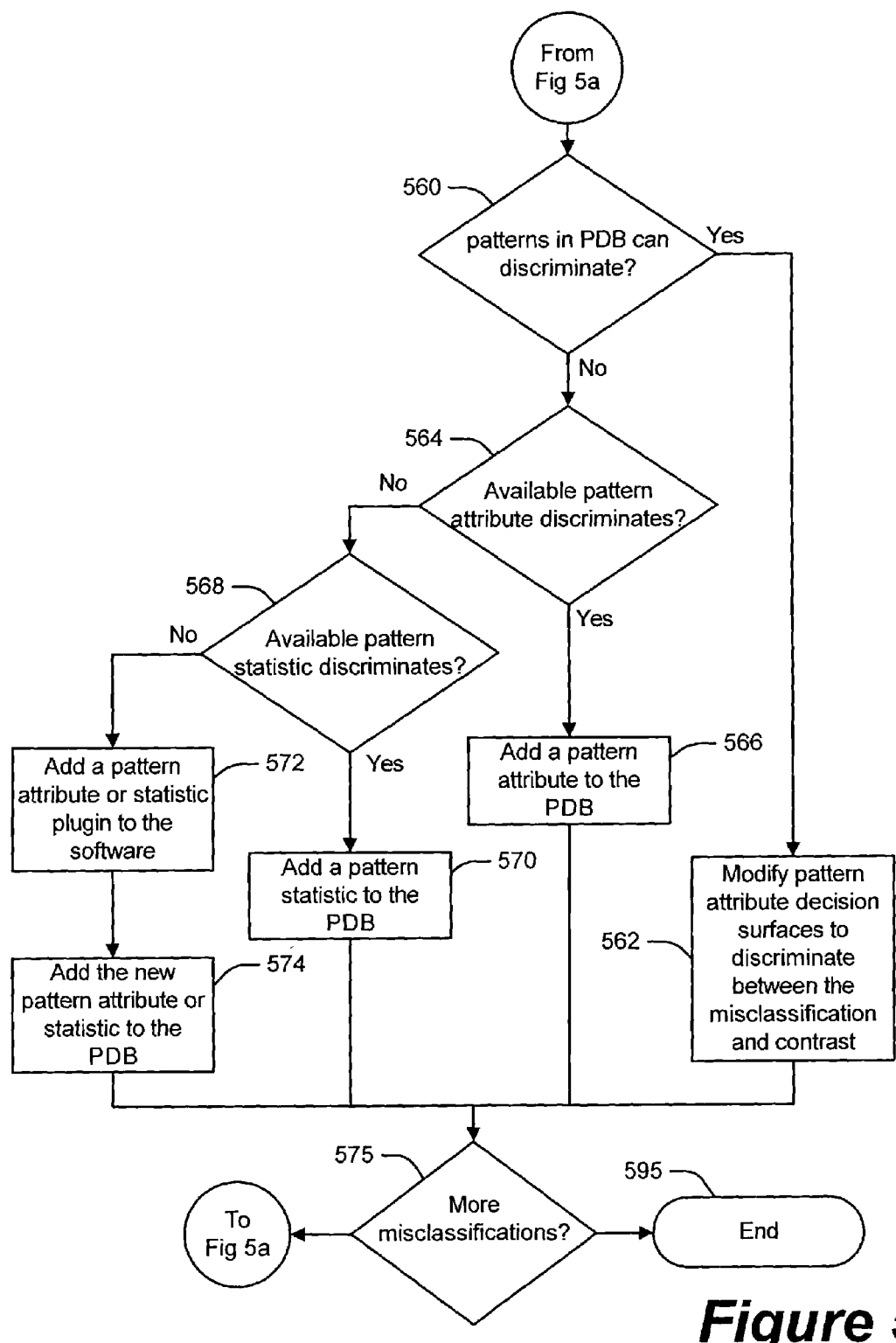
FIG. 5c is a flowchart illustrating an embodiment of a method of improving pattern attribute and statistic selection and related decision surface selection.
Figure 5D:
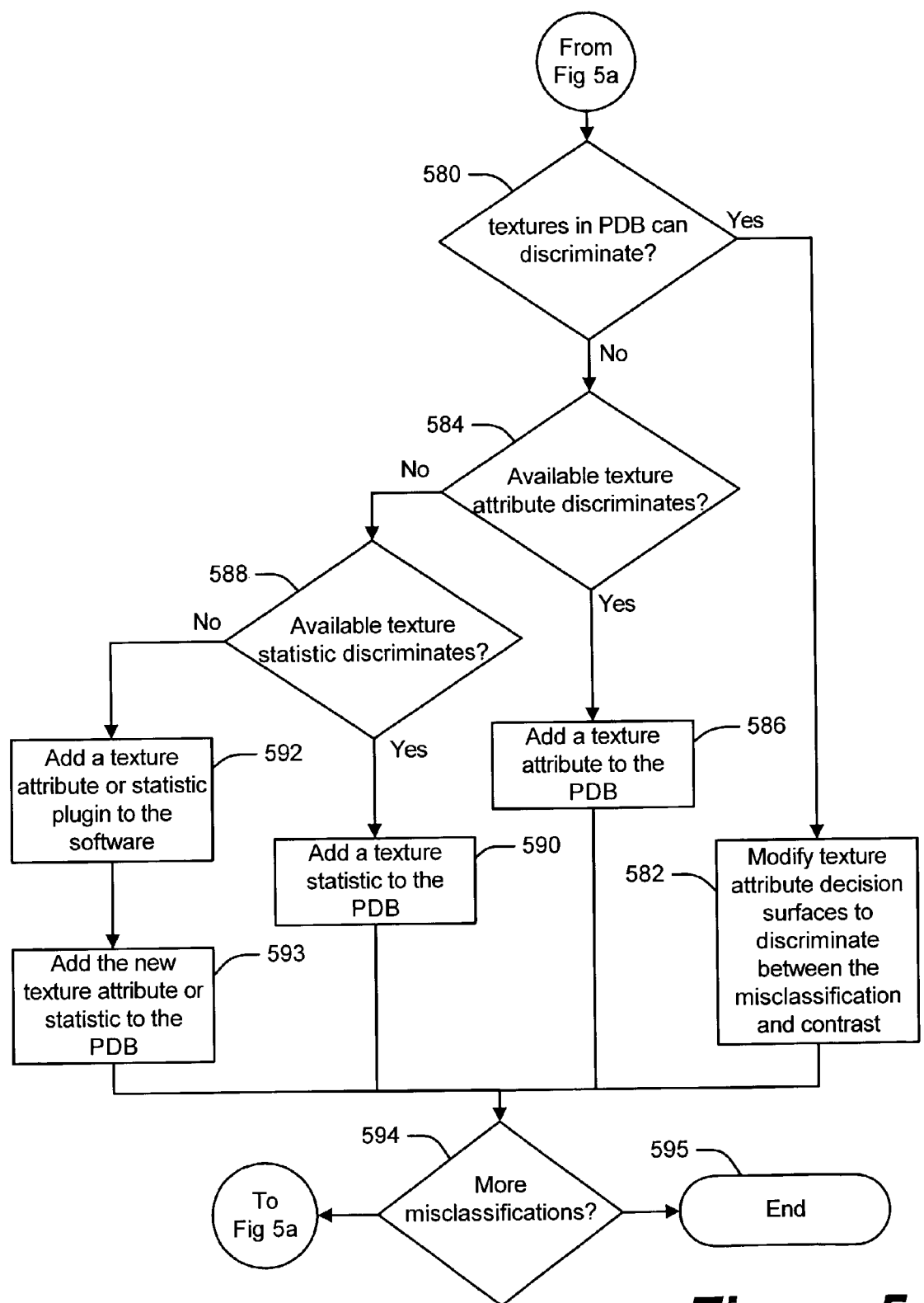
FIG. 5d is a flowchart illustrating an embodiment of a method of improving texture attribute and statistic selection and related decision surface selection.

Method of Identifying Target and Non-Target Hyperdimensional Fragments in the Absence of Well Data The present invention employs the above-identified apparatus for various purposes. The method of the present invention will now be illustrated via the identifying target and non-target hyperdimensional fragments in the absence of well data method of the present invention as illustrated in FIG. 4 by method 400. This method is usually performed as step 230 of method 200.

Step 405: Method 400 starts. The method starts generally at step 400.

Step 410: Initialization. In this step, the operator or an application the operator is executing prepares a list of examples which may be obtained from previously analyzed data set(s) or visually identified by the operator with the decision based on previous experience. The examples consist of geology which might contain hydrocarbons and geology which is unlikely to contain hydrocarbons. A pointer or selector for the list is initialized so that the first time step 415 is executed the first example in the list is selected.

Step 415: Next example. In this step, the operator or the application being executed by the operator proceeds to the next example in the list which is the first example when this step is performed for the first time.

Step 420: lead? In this decision step, the system operator determines if the example is an example of a lead which could contain hydrocarbons or is an example of data which is not a lead or is unlikely to contain hydrocarbons. If the example is a lead, then the method 400 switches to step 440; otherwise the method 400 proceeds to step 425.

Step 425: Identify fragment location. In this step, the operator or the application being executed by the operator identifies the feature fragment location(s) at the same spatial location as the example which does not qualify as a lead.

Step 430: Identify hyperdimensional fragment for non-target. In this step, the operator or the application the operator is executing identifies the hyperdimensional fragment for the non-target. The hyperdimensional fragment consists of the data value(s) plus all associated feature value(s), pattern values(s), texture value(s) and associated statistics for all levels in the PDB.

Step 435: Add to the non-target hyperdimensional fragment collection. In this step, the operator or the application the operator is executing adds the hyperdimensional fragment to the collection of non-target hyperdimensional fragments and method 400 switches to step 450.

Step 440: Identify fragment location. In this step, the operator or the application being executed by the operator identifies the feature fragment location(s) at the same spatial location as the example which qualifies as a lead.

Step 445: Identify hyperdimensional fragment for target. In this step, the operator or the application the operator is executing identifies the hyperdimensional fragment for the target. The hyperdimensional fragment consists of the data value(s) plus all associated feature value(s), pattern values (s), texture value(s) and associated statistics for all levels in the PDB.

Step 450: Add to the target hyperdimensional fragment collection. In this step, the operator or the application the operator is executing adds the hyperdimensional fragment to the collection of target hyperdimensional fragments.

Step 455: More examples? In this decision step, the system operator or the application the system operator is executing determines if there are more examples in the example list. If there are more examples, then the method 400 returns to step 415; otherwise the method 400 continues to step 495.

Step 495: Method 400 ends. The method 400 ends generally at step 495.

Method of Modifying a Template to Reduce Misclassifications or False Positives

The present invention employs the above-identified apparatus for various purposes. The method of the present invention will now be illustrated via the modifying a template to reduce misclassifications or false positives method of the present invention as illustrated in FIGS. 5*a*, 5*b*, 5*c*, and 5*d* by method 500. This method is usually performed as step 270 of method 200.

Step 502: Method 500 starts. The method starts generally at step 502.

Step 504: Identify misclassifications. In this step, the operator executes a visualization application to visualize and analyze the leads and underlying data identified by the template. Misclassifications may include leads which should not have been identified as leads, or false positives, and locations in the data which should have been classified as a lead but was not, with the decision based on the geoscientist's knowledge and previous experience. The misclassifications are placed in a list and a pointer is initialized so that the next time step 505 is executed the first misclassification in the list is selected.

Step 505: Next misclassifications. In this step, the operator or a computer application being executed by the operator increments the pointer to the current selection in the misclassification list to the next misclassification. The first time this step is executed the result is that the first misclassification is selected.

Step 506: Misclassification is a target hyperdimensional fragment? In this decision step, the system operator or the application the system operator is executing determines if the misclassification is a target hyperdimensional fragment or should be a lead. The operator bases this decision on the operator's knowledge and previous experience. If the misclassification is a target hyperdimensional fragment, then the method 500 proceeds to step 508; otherwise the method 500 jumps to step 510.

Step 508: Identify most similar non-target HDF and use as contrast HDF. In this step the system operator or the application the system operator is executing checks the list of non-target hyperdimensional fragments and identifies one which is most similar to the target hyperdimensional fragment being studied. This selection becomes a contrast hyperdimensional fragment used for comparison and the method 500 skips to step 515.

Step 510: Identify most similar target HDF and use as contrast HDF. In this step, the system operator or the application the system operator is executing checks the list of target hyperdimensional fragments and identifies one which is most similar to the non-target hyperdimensional fragment being studied. This selection becomes a contrast hyperdimensional fragment used for comparison.

Step 515: Visualize PDB and compare misclassification to the contrast. In this step, the operator executes a visualization application to visualize and analyze the misclassification and contrast along with the PDB contents.

Step 520: Difference lies between feature cuts? In this decision step, the system operator or the application the system operator is executing determines if the two examples have the greatest difference between feature cuts. Another way to accomplish the same objective is to determine if hyperdimensional fragments have the greatest difference at the feature level. If the greatest difference between the misclassification and contrast occurs between feature cuts, then the method 500 proceeds to step 540 of FIG. 5*b*; otherwise the method 500 proceeds to step 525.

Step 525: Difference lies between pattern cuts? In this decision step, the system operator or the application the system operator is executing determines if the two examples have the greatest difference between pattern cuts. Another way to accomplish the same objective is to determine if hyperdimensional fragments have the greatest difference at the pattern level. If the greatest difference between the misclassification and contrast occurs between pattern cuts, then the method 500 proceeds to step 560 of FIG. 5*c*; otherwise the method 500 proceeds to step 580 of FIG. 5*d*.

Step 540: Features in the PDB can discriminate? In this decision step, the system operator or the application the system operator is executing determines if the feature level attributes in the PDB are capable of discriminating between the misclassification and the contrast. If the features can discriminate, then the method 500 proceeds to step 542; otherwise the method 500 switches to step 544.

Step 542: Modify feature attribute decision surfaces to discriminate between the misclassification and contrast. In this step, the system operator or the application the system operator is executing modifies the parameters used to define the decision surface in the template, which classifies between leads (targets) and non-leads (non-targets), so that it lies between the misclassification and contrast. The computer application is instructed to perform the reclassification. When this step is completed method 500 proceeds to step 555.

Step 544: Available feature attributes can discriminate? In this decision step, the system operator or the application the system operator is executing determines if there are feature level attributes which might be able to discriminate between the misclassification and the contrast but were not placed in the PDB. If there are feature attributes which could discriminate, then the method 500 proceeds to step 546; otherwise the method 500 switches to step 548.

Step 546: Add a feature attribute to the PDB. In this step, the system operator executes an application which modifies the PDB by adding a feature attribute. When this step is completed method 500 proceeds to step 555.

Step 548: Available feature statistics can discriminate? In this decision step, the system operator or the application the system operator is executing determines if there are feature level statistics which might be able to discriminate between the misclassification and the contrast but were not placed in the PDB. If there are feature statistics which could discriminate, then the method 500 proceeds to step 550; otherwise the method 500 switches to step 552.

Step 550: Add a feature statistic to the PDB. In this step, the system operator executes an application which modifies the PDB by adding a feature statistic. When this step is completed method 500 proceeds to step 555.

Step 552: Add a feature attribute or statistic plug-in to the software. In this step, the system operator defines an algorithm which discriminates between the misclassification and the contrast and adds the algorithm to the software application either by adding a software plug-in, as a dynamically linked library, or by modifying the application, recompiling, and re-linking.

Step 550: Add a feature statistic to the PDB. In this step, the system operator executes the enhanced application which modifies the PDB by adding a feature attribute or statistic to the PDB.

Step 555: More misclassifications? In this decision step, the system operator or the application the system operator is executing determines if there are more misclassifications in the misclassification list. If there are more misclassifications, then the method 500 returns to step 505 of FIG. 5a; otherwise the method 500 switches to step 595.

Step 560: Patterns in the PDB can discriminate? In this decision step, the system operator or the application the system operator is executing determines if the pattern level attributes in the PDB are capable of discriminating between the misclassification and the contrast. If the features can discriminate, then the method 500 proceeds to step 562; otherwise the method 500 switches to step 564.

Step 562: Modify pattern attribute decision surfaces to discriminate between the misclassification and contrast. In this step, the system operator or the application the system operator is executing modifies the parameters used to define the decision surface in the template, which classifies between leads (targets) and non-leads (non-targets), so that it lies between the misclassification and contrast. The computer application is instructed to perform the reclassification. When this step is completed method 500 proceeds to step 555.

Step 564: Available pattern attribute discriminates? In this decision step, the system operator or the application the system operator is executing determines if there are pattern level attributes which might be able to discriminate between the misclassification and the contrast but were not placed in the PDB. If there are pattern attributes which could discriminate, then the method 500 proceeds to step 566; otherwise the method 500 switches to step 568.

Step 566: Add a pattern attribute to the PDB. In this step, the system operator executes an application which modifies the PDB by adding a pattern attribute. When this step is completed method 500 proceeds to step 575.

Step 568: Available pattern statistics can discriminate? In this decision step, the system operator or the application the system operator is executing determines if there are pattern level statistics which might be able to discriminate between the misclassification and the contrast but were not placed in the PDB. If there are pattern statistics which could discriminate, then the method 500 proceeds to step 570; otherwise the method 500 switches to step 572.

Step 570: Add a pattern statistic to the PDB. In this step, the system operator executes an application which modifies the PDB by adding a pattern statistic. When this step is completed method 500 proceeds to step 575.

Step 572: Add a pattern attribute or statistic plug-in to the software. In this step, the system operator defines an algorithm which discriminates between the misclassification and the contrast and adds the algorithm to the software application either by adding a software plug-in, as a dynamically linked library, or by modifying the application, recompiling, and re-linking.

Step 574: Add a pattern statistic to the PDB. In this step, the system operator executes the enhanced application which modifies the PDB by adding a pattern attribute or statistic to the PDB.

Step 575: More misclassifications? In this decision step, the system operator or the application the system operator is executing determines if there are more misclassifications in the misclassification list. If there are more misclassifications, then the method 500 returns to step 505 of FIG. 5a; otherwise the method 500 switches to step 595.

Step 580: Textures in the PDB can discriminate? In this decision step, the system operator or the application the system operator is executing determines if the texture level attributes in the PDB are capable of discriminating between the misclassification and the contrast. If the textures can discriminate, then the method 500 proceeds to step 582; otherwise the method 500 switches to step 584.

Step 582: Modify texture attribute decision surfaces to discriminate between the misclassification and contrast. In this step, the system operator or the application the system operator is executing modifies the parameters used to define the decision surface in the template, which classifies between leads (targets) and non-leads (non-targets), so that it lies between the misclassification and contrast. The computer application is instructed to perform the reclassification. When this step is completed method 500 proceeds to step 594.

Step 584: Available texture attribute discriminates? In this decision step, the system operator or the application the system operator is executing determines if there are texture level attributes which might be able to discriminate between the misclassification and the contrast but were not placed in the PDB. If there are texture attributes which could discriminate, then the method 500 proceeds to step 586; otherwise the method 500 switches to step 588.

Step 586: Add a texture attribute to the PDB. In this step, the system operator executes an application which modifies the PDB by adding a texture attribute. When this step is completed method 500 proceeds to step 594.

Step 588: Available texture statistics can discriminate? In this decision step, the system operator or the application the system operator is executing determines if there are texture level statistics which might be able to discriminate between the misclassification and the contrast but were not placed in the PDB. If there are texture statistics which could discriminate, then the method 500 proceeds to step 590; otherwise the method 500 switches to step 592.

Step 590: Add a texture statistic to the PDB. In this step, the system operator executes an application which modifies the PDB by adding a texture statistic. When this step is completed method 500 proceeds to step 594.

Step 592: Add a texture attribute or statistic plug-in to the software. In this step, the system operator defines an algorithm which discriminates between the misclassification and the contrast and adds the algorithm to the software application either by adding a software plug-in, as a dynamically linked library, or by modifying the application, recompiling, and re-linking.

Step 593: Add a texture statistic to the PDB. In this step, the system operator executes the enhanced application which modifies the PDB by adding a pattern attribute or statistic to the PDB.

Step 594: More misclassifications? In this decision step, the system operator or the application the system operator is executing determines if there are more misclassifications in the misclassification list. If there are more misclassifications, then the method 500 returns to step 505 of FIG. 5a; otherwise the method 500 switches to step 595.

Step 495: Method 400 ends. The method 500 ends generally at step 595.

The invention, therefore, is well adapted to carry out the objects and to attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those of ordinary skill in the art. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for generating templates in a computer system comprising:
    generating a pattern pyramid having:
        a data level;
        a feature level;
        a pattern level; and
        a texture level;
    classifying one or more attributes based on the data level and at least one level selected from the group of levels consisting of the feature level, the pattern level, and the texture level; and
    outputting one or more attribute classification results to an interpreter.

2. The method of claim 1, wherein said step of generating includes receiving raw data for said data level.

3. The method of claim 1, wherein said pattern pyramid has an inline fragment direction.

4. The method of claim 1, wherein said pattern pyramid has a time fragment direction.

5. The method of claim 1, wherein said pattern pyramid as an xline fragment direction.

6. The method of claim 1, wherein said pattern pyramid as an inline fragment direction, a time fragment direction, and an xline fragment direction.

7. The method of claim 1, wherein said method of generating has a pre-stack phase for said data level.

8. The method of claim 7, wherein said method of generating has a post stack phase for said data level.

9. The method of claim 1, wherein said method of generating has a cut phase for said feature level.

10. The method of claim 9, wherein said method of generating has an attribute phase for said feature level.

11. The method of claim 9, wherein said method of generating has a statistic phase for said feature level.

12. The method of claim 1, wherein said method of generating has a cut phase for said pattern level.

13. The method of claim 12, wherein said method of generating has all attribute phase for said pattern level.

14. The method of claim 12, wherein said method of generating has a statistic phase for said pattern level.

15. The method of claim 1, wherein said method of generating has a cut phase for said texture level.

16. The method of claim 15, wherein said method of generating has an attribute phase for said texture level.

17. The method of claim 15, wherein said method of generating has a statistic phase for said texture level.

18. The method of claim 1, wherein said step of generating produces a hyperdimensional template having at least one point in each of said levels.

19. The method of claim 18, wherein one or more of said hyperdimensional templates is stored on a storage media.

20. The method of claim 1, wherein said step of generating includes a step of identifying target hyperdimensional fragments.

21. The method of claim 1, wherein said step of generating includes a step of identifying non-target hyperdimensional fragments.

22. The method of claim 1, wherein said step of generating includes a step of identifying target hyperdimensional fragments in the presence of well data.

23. The method of claim 1, wherein said step of generating includes a step of identifying target hyperdimensional fragments in the absence of well data.

24. The method of claim 1, wherein said step of generating includes a step of identifying non-target hyperdimensional fragments in the presence of well data.

25. The method of claim 1, wherein said step of generating includes a step of identifying non-target hyperdimensional fragments in the absence of well data.

26. The method of claim 1, wherein said step of generating includes a step of modifying a template to reduce misclassification.

27. The method of claim 1, wherein said step of generating includes a step of modifying a template to reduce the potential for a false positive.

28. The method of claim 1, wherein said step of generating includes a step of modifying a feature attribute selection.

29. The method of claim 1, wherein said step of generating includes a step of modifying a feature statistic selection.

30. The method of claim 1, wherein said step of generating includes a step of modifying a feature decision surface selection.

31. The method of claim 1, wherein said step of generating includes a step of modifying a pattern attribute selection.

32. The method of claim 1, wherein said step of generating includes a step of modifying a pattern statistic selection.

33. The method of claim 1, wherein said step of generating includes a step of modifying a pattern decision surface selection.

34. The method of claim 1, wherein said step of generating includes a step of modifying a texture attribute selection.

35. The method of claim 1, wherein said step of generating includes a step of modifying a texture statistic selection.

36. The method of claim 1, wherein said step of generating includes a step of modifying a texture decision surface selection.

37. An apparatus for generating templates in a computer system having a central processing unit, system memory operatively connected to said central processing unit, and a storage unit operative with said central processing unit and said system memory, said apparatus further comprising:
a pattern database on said storage unit for storing one or more of said templates; and
said central processing unit constructed and arranged to generate a pattern pyramid having:
a data level;
a feature level;
a pattern level; and
a texture level;
where the data level and at least one level selected from the group of levels consisting of the feature level, the pattern level, and the texture level are used to classify one or more attributes; and
where said central processing unit is further constructed and arranged to output one or more attribute classification results to an interpreter.

38. The apparatus of claim 37, wherein said central processing unit constructed and arranged to receive raw data for said data level.

39. The apparatus of claim 37, wherein said pattern pyramid has an inline fragment direction.

40. The apparatus of claim 37, wherein said pattern pyramid has a time fragment direction.

41. The apparatus of claim 37, wherein said pattern pyramid as an inline fragment direction.

42. The apparatus of claim 37, wherein said pattern pyramid as an inline fragment direction, a time fragment direction, and an xline fragment direction.

43. The apparatus of claim 37, wherein said central processing unit constructed and arranged to compute a pre-stack phase for said data level.

44. The apparatus of claim 43, wherein said central processing unit constructed and arranged to compute a post stack phase for said data level.

45. The apparatus of claim 37, wherein said central processing unit constructed and arranged to compute a cut phase for said feature level.

46. The apparatus of claim 45, wherein said central processing unit constructed and arranged to compute an attribute phase for said feature level.

47. The apparatus of claim 45, wherein said central processing unit constructed and arranged to compute a statistic phase for said feature level.

48. The apparatus of claim 37, wherein said central processing unit constructed and arranged to compute a cut phase for said pattern level.

49. The apparatus of claim 48, wherein said central processing unit constructed and arranged to compute an attribute phase for said pattern level.

50. The apparatus of claim 48, wherein said central processing unit constructed and arranged to compute a statistic phase for said pattern level.

51. The apparatus of claim 37, wherein said central processing unit constructed and arranged to compute a cut phase for said texture level.

52. The apparatus of claim 51, wherein said central processing unit constructed and arranged to compute an attribute phase for said texture level.

53. The apparatus of claim 51, wherein said central processing unit constructed and arranged to compute a statistic phase for said texture level.

54. The apparatus of claim 37, wherein said central processing unit constructed and arranged to produce a hyperdimensional template having at least one point in each of said layers.

55. The apparatus of claim 54, wherein one or more of said hyperdimensional templates is stored on a storage media.

56. The apparatus of claim 37, wherein said central processing unit constructed and arranged to identify target hyperdimensional fragments.

57. The apparatus of claim 37, wherein said central processing unit constructed and arranged to identify non-target hyperdimensional fragments.

58. The apparatus of claim 37, wherein said step central processing unit constructed and arranged to identity target hyperdimensional fragments in the presence of well data.

59. The apparatus of claim 37, wherein said central processing unit constructed and arranged to identify target hyperdimensional fragments in the absence of well data.

60. The apparatus of claim 37, wherein said central processing unit constructed and arranged to identify, non-target hyperdimensional fragments in the presence of well data.

61. The apparatus of claim 37, wherein said central processing unit constructed and arranged to identify non-target hyperdimensional fragments in the absence of well data.

62. The apparatus of claim 37, wherein said central processing unit constructed and arranged to modify a template to reduce misclassification.

63. The apparatus of claim 37, wherein said central processing unit constructed and arranged to modify a template to reduce the potential for a false positive.

64. The apparatus of claim 37, wherein said central processing unit constructed and arranged to modify a feature attribute selection.

65. The apparatus of claim 37, wherein said central processing unit constructed and arranged to modify a feature statistic selection.

66. The apparatus of claim 37, wherein said central processing unit constructed and arranged to modify a feature decision surface selection.

67. The apparatus of claim 37, wherein said central processing unit constructed and arranged to modify a pattern attribute selection.

68. The apparatus of claim 37, wherein said central processing unit constructed and arranged to modify a pattern statistic selection.

69. The apparatus of claim 37, wherein said central processing unit constructed and arranged to modify a pattern decision surface selection.

70. The apparatus of claim 37, wherein said central processing unit constructed and arranged to modify a texture attribute selection.

71. The apparatus of claim 37, wherein said central processing unit constructed and arranged to modify a texture statistic selection.

72. The apparatus of claim 37, wherein said central processing unit constructed and arranged to modify a texture decision surface selection.

\* \* \* \* \*